(12) United States Patent
Cho

(10) Patent No.: US 9,931,571 B2
(45) Date of Patent: Apr. 3, 2018

(54) SYSTEMS, METHODS AND TECHNIQUES FOR SAFELY AND EFFECTIVELY COORDINATING VIDEO GAME PLAY AND OTHER ACTIVITIES AMONG MULTIPLE REMOTE NETWORKED FRIENDS AND RIVALS

(75) Inventor: Wing Cho, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 365 days.

(21) Appl. No.: 11/464,895

(22) Filed: Aug. 16, 2006

(65) Prior Publication Data
US 2007/0218997 A1  Sep. 20, 2007

Related U.S. Application Data

(60) Provisional application No. 60/783,056, filed on Mar. 17, 2006.

(51) Int. Cl.
*A63F 9/24* (2006.01)
*A63F 13/795* (2014.01)
(Continued)

(52) U.S. Cl.
CPC ............ *A63F 13/795* (2014.09); *A63F 13/12* (2013.01); *A63F 13/327* (2014.09); *A63F 13/335* (2014.09);
(Continued)

(58) Field of Classification Search
CPC ....................................... A63F 13/87
(Continued)

(56) References Cited

U.S. PATENT DOCUMENTS 3,008,367 A   11/1961  Parsons et al.
4,149,444 A   4/1979   Parsons
(Continued)

FOREIGN PATENT DOCUMENTS

WO   02/061707   8/2002

OTHER PUBLICATIONS www.safelibraries.org, Dangers Children Face in Cyberspace, 2 pages. (Mar. 2006).
(Continued)

*Primary Examiner* — David L Lewis
*Assistant Examiner* — Robert Mosser
(74) *Attorney, Agent, or Firm* — Nixon & Vanderhye P.C.

(57) ABSTRACT

Real time interactive networked gaming is provided with two different classes of bookmarked online game players: "Friends" and "Rivals." "Friends" are game players that are known personally. "Rivals" are game players who are not known personally but whom one has played against in the past in an online gaming scenario. Game software may allow chatting or other direct communication with "Friends" but not with "Rivals." Rivals may be tracked to a limited degree so that for example it is possible to play against the Rival when he or she is online. Rivals may for example be players who you wish to track or keep track of, but in a manner that is safe for both you and the "rival." When a player goes online again, he or she can see whether his or her Rivals are online and invite them to play another game. Inviting Rivals to play may be selectable, so an online player can invite Friends, Rivals or both to play.

21 Claims, 29 Drawing Sheets

(51) Int. Cl.
  *A63F 13/327* (2014.01)
  *A63F 13/30* (2014.01)
  *A63F 13/335* (2014.01)
  *A63F 13/87* (2014.01)

(52) U.S. Cl.
  CPC ......... *A63F 13/87* (2014.09); *A63F 2300/406* (2013.01); *A63F 2300/407* (2013.01); *A63F 2300/556* (2013.01); *A63F 2300/5566* (2013.01)

(58) Field of Classification Search
  USPC .................................................... 463/40, 42
  See application file for complete search history.

(56) References Cited

U.S. PATENT DOCUMENTS

| | | | |
|---|---|---|---|
| 4,679,479 A | 7/1987 | Koyamato | |
| 4,821,121 A | 4/1989 | Beaulier | |
| 4,913,023 A | 4/1990 | Mizuguchi et al. | |
| 5,618,179 A | 4/1997 | Copperman et al. | |
| 6,115,036 A | 9/2000 | Yamato et al. | |
| 6,203,433 B1 | 3/2001 | Kume | |
| 6,366,283 B1 | 4/2002 | Tampieri | |
| 6,488,505 B1 | 12/2002 | Hightower | |
| 6,645,067 B1 | 11/2003 | Okita et al. | |
| 6,658,464 B2 | 12/2003 | Reisman | |
| 6,692,359 B1* | 2/2004 | Williams et al. | 463/42 |
| 6,699,125 B2 | 3/2004 | Kirmse et al. | |
| 6,755,654 B2 | 6/2004 | Hightower | |
| 6,821,205 B2 | 11/2004 | Takahashi | |
| 6,845,389 B1 | 1/2005 | Sen et al. | |
| 6,848,997 B1* | 2/2005 | Hashimoto et al. | 463/42 |
| 6,884,171 B2 | 4/2005 | Eck et al. | |
| 7,032,007 B2 | 4/2006 | Fellenstein et al. | |
| 7,066,818 B2 | 6/2006 | Ikeda | |
| 7,099,304 B2 | 8/2006 | Liu et al. | |
| 7,311,608 B1 | 12/2007 | Danieli et al. | |
| 7,991,895 B2* | 8/2011 | Leppisaari et al. | 709/227 |
| 8,880,731 B2 | 11/2014 | Behrens | |
| 2002/0086730 A1 | 7/2002 | Nakai | |
| 2002/0142842 A1 | 10/2002 | Easley et al. | |
| 2002/0142846 A1 | 10/2002 | Paulsen | |
| 2002/0183117 A1 | 12/2002 | Takahashi et al. | |
| 2003/0051003 A1 | 3/2003 | Clark et al. | |
| 2003/0125112 A1 | 7/2003 | Silvester | |
| 2003/0233537 A1 | 12/2003 | Wohlgemuth et al. | |
| 2004/0002382 A1 | 1/2004 | Ho et al. | |
| 2004/0002384 A1 | 1/2004 | Multerer et al. | |
| 2004/0111479 A1 | 6/2004 | Borden et al. | |
| 2004/0152517 A1 | 8/2004 | Hardisty et al. | |
| 2004/0153557 A1 | 8/2004 | Shochet et al. | |
| 2004/0162144 A1 | 8/2004 | Loose et al. | |
| 2004/0164897 A1 | 8/2004 | Treadwell et al. | |
| 2004/0192440 A1 | 9/2004 | Evans et al. | |
| 2004/0224741 A1 | 11/2004 | Jen et al. | |
| 2004/0224769 A1 | 11/2004 | Hansen et al. | |
| 2004/0224772 A1 | 11/2004 | Canessa et al. | |
| 2004/0225386 A1 | 11/2004 | Thompson et al. | |
| 2005/0160144 A1 | 7/2005 | Bhatia | |
| 2005/0239055 A1 | 10/2005 | Hardisty et al. | |

OTHER PUBLICATIONS

CheckIM.com, "Proactive protection for the masses, About," 2 pages (2004).
CheckIM.com, "Proactive protection for the masses, Trace Online Predators," 2 pages (2005).
Wave Race—Blue Storm for the Nintendo GameCube platform.
Activision's Tony Hawk American Sk8Land for Nintendo DS.
Namco's Ridge Racer 6 for Xbox 360.
Sony's Wipeout Pure for PSP.
Vivendi's Crash Nitro Kart for NGage.
Midway's San Francisco Rush 2049 for the Sega Dreamcast.
Xbox Live, http://www.xbox.com/en-US/live, 4 pages (downloaded Feb. 28, 2006).
GameSpy, www.gamespy.net, 5 pages (copyright 1995-2005).
Quazal, www.quazal.com, 10 pages (2004).
SegaNet.
Warp Pipe, www.warppipe.com, http://cubeonline.warppipe.com/gettingstarted/finding_opponents.html, 5 pages (2003-2006).
NGage Arena, (2006). www.n-gage.com, http://www.n-gage.com/en-US/support/NgageArena/featuresglossary.htm, 4 pages (2006).
Battle.net, www.battle.net, 5 pages (2006).
Xfire, www.xfire.com, 14 pages (2006).
Demonware, www.demonware.net, 6 pages (2006).
Mplayer, http://web.archive.org/web/20000510010549/http://mplayer.com/, http://web.archive.org/web/20001109171600/www.mplayer.com/gamers/help/online/, 5 pages (May 9, 2000).
TEN (Total Entertainment Network).
Sega HEAT.
Kali www.kali.net , 3 pages (1995-2005).
GameSpot, www.gamespot.com, 5 pages (2006).
AOL, www.aol.com, http://games.aol.com/aimgames, 11 pages. (2006).
Engage.
DWANGO
MPG-Net.
Quantum Link.
www.zone.com MSN Games, People and Chat, 4 pages (2006).
www.pogo.com, 3 pages (.
http://www.cnn.com/TECH/computing/9802/12/online_gaming_part2/, Feb. 12, 1998, 5 pages.
http://www.findarticles.com/p/articles/mi_m0EIN/is_1996_May_16/ai$_{13}$ 18290451, May 16, 1996, 2 pages.
http://games.ign.com/objects/027/027615.html, 3 pages (1996-2000).
http://www.internetnews.com/xSP/article.php/45591, Dec. 18, 1998, 4 pages.
International Preliminary Report on Patentability (dated Feb. 28, 2008).and Written Opinion of the International Search Authority for PCT/US2006/032538 (dated Jan. 26, 2007), 11 pages.
Nokia Press Release, "New N-Gage™ Titles Turn Up the Heat on Mobile Gaming", Dec. 1, 2003, 2 pages, http://press.nokia.com/PR/200312/926705_5.html.
Nokia Press Release, "Nokia shows multiplayer Java games with key community features at E3", May 12, 2004, 2 pages, http://press.nokia.com/PR/200405/945290_5.html.
Information Disclosures Statement filed in U.S. Appl. No. 11/207,194 (dated Mar. 2, 2006).
U.S. Appl. No. 13/898,378, filed May 20, 2013, pending.
U.S. Appl. No. 11/429,250, filed May 8, 2006, allowed.
U.S. Appl. No. 12/483,450, filed Jun. 12, 2009, On Appeal—Awaiting Decision by the Board of Appeals.
U.S. Appl. No. 12/483,587, filed Jun. 12, 2009, now U.S. Pat. No. 8,353,773.
Ad Hoc Mode, Google books screenshot, 2 pages.
Ad Hoc Network, Google books screenshot, 1 page.
Danielyan, Edgar, "IEEE 802.11," The Internet Protocol Journal, vol. 5, No. 1, Mar. 2002, 7 pages.
Geier, Jim, "Understanding Ad Hoc Mode," Tutorials, Aug. 23, 2002, 6 pages.
Jacobsen, Ole J., Editor, "The Internet Protocol Journal," vol. 5, No. 1, Mar. 2002, 32 pages.
Nintendo DS Metroid Prime Hunters Instruction Booklet, Nintendo of America Inc., 2004-2006, 32 pages.
802.11-1999, IEEE Standard for Information Technology—Telecommunications and information exchange between systems—Local and Metropolitan Area networks—Specific requirements, Part 11: Wireless LAN Medium Access Control (MAC) and Physical Layer (PHY) Specifications, IEEE Computer Society, https://standards.ieee.org/findstds/standard/802.11a-1999.html.

* cited by examiner

SYSTEMS, METHODS AND TECHNIQUES FOR SAFELY AND EFFECTIVELY COORDINATING VIDEO GAME PLAY AND OTHER ACTIVITIES AMONG MULTIPLE REMOTE NETWORKED FRIENDS AND RIVALS

CROSS-REFERENCES TO RELATED APPLICATIONS

This application is a nonprovisional application claiming the benefit of priority from application No. 60/783,056 filed on Mar. 17, 2006 and entitled "Systems, Methods And Techniques For Safely And Effectively Coordinating Video Game Play And Other Activities Among Multiple Remote Networked Friends And Rivals", incorporated herein by reference as if expressly set forth.

FIELD

The technology herein relates to networked gaming, and more particularly to systems, methods and techniques for coordinating real time activities of multiple networked video game players and/or other users. Still more particularly, the techniques herein relate to player lists or rosters in multi-player games which allow players to "bookmark" other players based on relationships between players (e.g., whether they players know one another personally) and/or other characteristics.

BACKGROUND AND SUMMARY

Within the last decade, computerized gaming, computer graphics and electronic networking have revolutionized remote networked game play. The Internet, cellular communications networks, and wireless communications networks such as WI-FI have opened exciting new possibilities for networked multiplayer gaming. If one desires the competitiveness of a multiplayer game and it isn't practical or possible to invite friends over, it's now possible to connect to a network and use the network to carry game play signaling between different gaming or other appliances. A child can now operate a handheld gaming platform at a kitchen table or in a fast food restaurant and interact wirelessly in real time with another player across town, across the country or on the other side of the globe. One can play against friends, neighbors, acquaintances or people one hasn't yet met.

Technology may sometimes have unintended consequences. Widely available digital networked communications and easy-to-use interfaces provide enhanced connectivity and accessibility, but also create risks inherent in any anonymous or pseudo-anonymous mode of communications. As much as we sometimes might not like to think about it, we share the world with charlatans, criminals and predators who may wish us and our children harm. For their own self-interests, such miscreants can take advantage of the anonymity of computer networks to learn information that can compromise our security and privacy. It is not always possible to ascertain with any certainty the true identity of people communicating over a computer network, but predators can often glean information through computer text and/or voice chat, blogs and other networked message exchanges that they can then use to invade our privacy and our lives.

Email communications over a computer network is similar in many ways to conventional mail delivered to your home mailbox. You can simply throw away or delete email messages that you consider to be "junk mail." Real time instant messaging and chat, on the other hand, can be more aggressive and more difficult to ignore. Upon entering and participating in an Internet or other network "chat room," one does not really know who the people in the chat room really are. An adult may be able to successfully masquerade as a child for a variety of purposes—some of them nefarious. For these and other reasons, most parents are not comfortable having their children chat with people their children do not already know.

Many online games allow players to chat with other players within or outside of a game environment. A common feature that many of these games share is that an updated list is kept by a server of all players on the network at a given time. This allows players to search for opponents or allies for an upcoming game. However, browsing through lists of online participants can be tedious. A game may have thousands of players logged on at a given time. Players may have to spend a good deal of time searching the list for a proper competitor or a friend met in a previous match. In the past, lists have been provided with sorting functions, such as alphabetical sorting, to facilitate opponent and friend searching. Additionally, some online environments have allowed players to bookmark "buddies" (online friends) in a manner similar to "Instant Messaging" offered by America Online and others.

Unfortunately, due to the exploitation of the Internet by unsavory characters, it may not be safe for a child to select and maintain an online relationship with a "buddy" he or she does not know. Previous buddy lists generally do not include any way of weeding out "dangerous" acquaintances from "safe" ones. Parents may be reluctant to allow children to play in such online environments.

Needs exist for a safe method of providing an online buddy or similar list or roster that does not potentially expose children to undesirably intrusive contacts. Additionally, needs exist for methods of preventing unapproved player tracking. Such methods should not interfere overmuch with the general purpose and function of the buddy list, which is to allow players to easily meet with, communicate with, and play with selected friends and rivals online.

To help ensure privacy, Nintendo recommends that a player should never give out personal information such as last name, phone number, birth date, age, email address or home address when communicating with others. For example, Nintendo provides a Wi-Fi Connection ID for use with its Nintendo DS portable video game system. A player's Wi-Fi Connection ID is tied to a Friend Roster and is stored on the player's Nintendo DS system. Nintendo recommends players should be sure to properly safeguard their Nintendo DS system and to delete user information from the Nintendo "WFC" set up, if the player will no longer be using the system or game, to prevent a subsequent user from having access to the Friend Roster. Nintendo also warns players about receiving messages from, or communicating with strangers; recommends having an adult assist children with system setup and instruct them not to use personal information for their nickname and personal message; asks parents to be sure children know how to identify when someone has entered a chat room; and has parents instruct their children not to use the chat feature if the parents are not comfortable with such use. While these precautions are helpful and useful, further improvements are possible and desirable.

The technology herein provides methods for "buddy list" implementation that keep all desired aspects of a buddy list intact while securely protecting the user from online miscreants and invasion of privacy and security.

Using an exemplary illustrative non-limiting implementation, once you're connected to the network it's time to hop into a game. You control who you play with. You can connect with friends you know or find new opponents online. You can exchange unique Friend Keys with the people you know so you can play and chat with each other when you're both online. When a friend is not online, or when you feel like taking on a new challenger, a matchmaking server can find opponents for you. No personal information is transmitted, so you can have fun competing securely and anonymously. In certain games, you can also get connected by being "auto-matched." Auto-match goes out and randomly sets a game player up with any other game player who is online and looking to play. This broadens the number of opponents who you can be matched against to thousands of other players around the world. The way Auto-match is set up and used may be different for each game. For example, in some games, a player can choose whether he or she wishes to play only against players on their Friends Roster, players within the same geographical region, or players anywhere in the world. Not all games need to contain a chat feature. For those that do, "open" chat is generally allowed between friends who have exchanged Friend Codes. "Open" chat may also be possible if two players who have not exchanged Friend Codes interact with a game hosted by another player with whom they have both exchanged Friend Codes. "Closed" chat can be provided as an operational mode in which a player can select from a set of "canned" phrases to send to an opponent but which restricts content (e.g., so that the player may not type whatever he or she wants).

One exemplary illustrative technique provides two different classes of "remembered" online game players: "Friends" and "Rivals." "Friends" are game players that are known personally and with whom chatting is permissible. "Rivals" may be game players who are not known personally but whom one has played against in the past in an online gaming scenario. Game software may allow chatting or other direct communication with "Friends" but not with "Rivals." Rivals may be tracked to a limited degree so that for example it is possible to play against the Rival when he or she is online. Rivals may for example be players who you wish to track or keep track of, but in a manner that is safe for both you and the "rival." The exemplary illustrative non-limiting technology herein allows the game player to "bookmark" or otherwise keep track of Rivals (i.e., strangers that you have played with in the past). When a player goes online again, he or she can see whether his or her Rivals are online and invite them to play another game. Inviting Rivals to play may be selectable, so an online player can invite Friends, Rivals or both to play.

In other exemplary illustrative non-limiting implementations, it may be possible to send certain predefined or "canned" messages to Rivals while prohibiting "free chat" reserved for Friends. Such exemplary illustrative non-limiting arrangements might, for example, allow a player to send an invitation message to a Rival asking the Rival whether he or she wishes to join a game, but limit the ability of the player to send any other information (e.g., personal information that might reveal his or her identity) for safety reasons. Rivals may or may not have other qualifications as well (e.g., similar rankings or standings). In accordance with additional exemplary illustrative non-limiting implementations of the technology herein, a "lobby" system allows a game player to see who (i.e., which Friends and which Rivals) is online before starting a game. The player can then start a game in the hope that a Friend or Rival will join or the player may be able to invite the Friend or Rival to join the game. Such tracking techniques can operate, if desired, in conjunction with a website or other auxiliary presentation technique to allow players to find, track, and determine the online/offline state of "Friends" and "Rivals." Different colored displays or other presentation technique can be used to indicate status.

Game players who do not wish to be tracked may, in exemplary illustrative non-limiting implementations herein, deactivate tracking so that it is not possible for others to determine their online/offline state. Different classes or categories of players may be provided with access to voice chat, text chat capabilities, or neither. For example, voice chat and text chat may be limited only to Friends and not extended to Rivals in one exemplary illustrative non-limiting implementation of the technology herein.

In one exemplary illustrative non-limiting implementation, if you have a Friend set up on your list, you can use the voice-over IP chat online, or you can chat with them using the messenger program. There is also a way to keep track of Rivals too, but still keep everyone safe online. After you play someone, you can decide to add them to your Rivals list. If they agree, you will become Rivals. Then you can follow that person's statistics and you can try to connect with them again later. If you activate your Rival Radar and pass by someone else who has it on, you'll download their Hunter's License and they'll become your Rival.

According to other aspects of exemplary illustrative non-limiting implementations, players may be added as a Friend to a buddy list only when the player has met face-to-face with another player and exchanged a buddy card. A buddy card is a virtual "card" representing the relevant attributes of the player, and may contain any information that the game developer desires. Players who are not face-to-face may exchange cards through use of user passwords or other protections based on for example mutual agreement.

According to further aspects of exemplary illustrative non-limiting implementations, users may add rivals, who are different from buddies, to a list of rivals. This list can be part of the buddy list or it can be a separate list entirely. In some exemplary illustrative implementations, a player may only be added to a rival list after giving permission to be added.

Further exemplary illustrative non-limiting features and advantages of an exemplary illustrative non-limiting implementation include:

Buddy List:
  "Buddy List" allows users to keep track of their "Buddies" (people they know) indicating if they are online or not and even chat with them.
  "Buddy List" also allow these online "Buddies" to join each other's games in order to play against each other.
  "Buddy List" consists of a collected database of "Gamer's Cards" in which players exchange during LAN (face to face) Multiplayer games.
  Because players exchanged these "Gamer's Card" from playing someone else face to face (and assuming they know them), these "Gamer's Card" fall under a player's "Buddy List", allowing them to find and play with them online, and even allow them to CHAT with each other.
  There are other possible ways to exchange "Gamer's Cards" with real friends (people you know) in which doesn't involve face to face interaction. It is possible to set up an online portal ID key/password exchange in which players need to enter a certain code at the same time in order for the game to find each other and exchange "Gamer's Card"

Rival List:
  "Rival List" will allow users to keep track of "rivals", players they have played against online. These online "rivals" are (most likely) total strangers to the player.
  "Rival List" is made of up of "Gamer's Cards" that were exchanged after a Wi-Fi Connect online match with online players. Also, these exchange of "Gamer's Card" must be confirmed by both players.
  Because of online safety concerns, a player's "Rival List" only allows them to "track" their "Rivals" (see if they are online or not) and invite them to a game. Players will not be able to chat with their "Rivals" and certain information on their "Gamer's Card" may also be limited/hidden from their "Rivals". Only "Buddies" can see all information on your "Gamer's Card"

Bookmarking Rivals:
  After completing a Wi-Fi Connect online match with random (strangers) players, a list of all current players' standing and stats of the previous game can be shown. Here, any player can go down the list and "check off" or "bookmark" any of the other players as a "Rival" in order to keep track of them later.
  This "bookmarking" is done without any confirmation or knowledge of the other player.
  Once a "Rival" has been "bookmarked", a player can keep track of that player and use the options of the game to always show up in games against the "Rival."
  In some implementations, the player can also request a "Rival" to become a "Buddy".

Gamers Card or Buddy Card
  Every player will have a CARD that you can exchange with other players. Each CARD will have certain information about that player.
  Exchanging GAMERS CARD will also put each player on each others BUDDY/RIVAL LIST for easier locating when online.
  A player is either a BUDDY or a RIVAL based on how they exchanged their GAMERS CARD.
  A player becomes a RIVAL after playing them ONLINE and then agreeing to exchange a GAMERS CARD.
  A player becomes a BUDDY when players exchange GAMERS CARD in REAL LIFE by just playing a LAN game with them.
  Players can be BUDDY thru the Internet using the ADD BUDDY function below.

Gamers Card
  May contain the following information:
    NAME
    RANKING (this can be updated every time that person goes online)
    FAVORITE CHARACTER USED (this can be updated every time that person goes online)
    LOCATION (if desired)
    WINS/LOSES/KILLS (this can be updated every time that player goes online)
    Other Buddy Card
  To be on each other's BUDDY LIST, EACH PLAYER must have EACH OTHER'S BUDDY CARD.
  To exchange a BUDDY CARD, players can exchange in REAL LIFE by just playing a LAN game with them (or wireless LAN trade).
  Players can also exchange BUDDY CARDS thru the Internet using the ADD BUDDY function.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION

Figure 1:
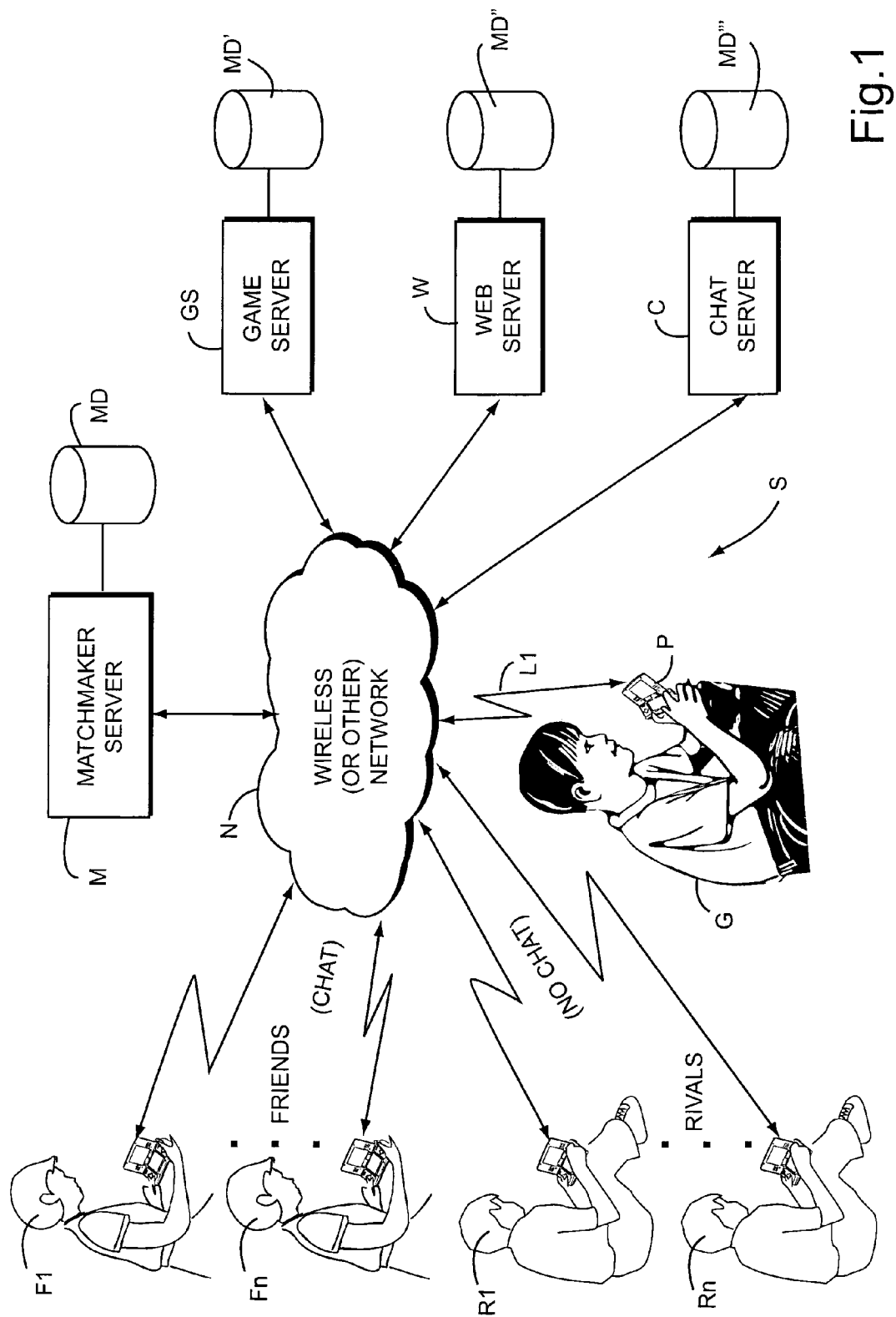
FIG. 1 shows an exemplary illustrative non-limiting implementation of an overall networked gaming system.

FIG. 1 shows an exemplary illustrative non-limiting implementation of a networked gaming system S. In the exemplary illustrative non-limiting system S, a gamer G plays a video game or runs another networked application on a networked gaming or other platform P. Platform P can be for example a Nintendo DS portable handheld wireless gaming platform, the Nintendo Revolution platform, or any other gaming or other networked platform capable of playing a game or providing other application(s).

Gaming platform P connects via a wireless or wired link L1 to a network N. Network N can be for example the Internet, an 802.11 wireless "WI-FI" network in the ad hoc or infrastructure mode, a cellular telephone network, a local area network, a wide area network, or any other network capable of communicating information between devices. Platform P uses the network to allow gamer G to play multi-player games against other gamers F1 . . . FN, R1 . . . RN who may be remotely located. These other gamers can be located across the room, across town or across the world.

As further shown in FIG. 1, servers such as a matchmaker server M, a game server GS, a web server W and a chat server C are coupled directly or indirectly to network N. Gaming platforms P, F1 . . . FN, R1 . . . RN can communicate with these various servers M, GS and W via network N. In the exemplary illustrative implementation, each of servers includes a mass storage device MD for securely storing information concerning the identities and other information about users of gaming platforms P, F1 . . . FN, R1 . . . RN.

Matchmaker server M (which may be a conventional server and associated software provided by Game Spy) matches up video game players based on skill level, previous game statistics, geographical location, or any of a variety of other characteristics, and may keep track of player status information such as which players are online and which ones are not, which online players are already engaged in playing a game and which ones are waiting to play, which "ready room" each player inhabits waiting to play a game with others in the same virtual "ready room", and other functionality.

Web server W (which may be coupled to matchmaker server M) can allow gamers to access certain types of status information about other players via a conventional web browser launched on gaming platforms P or other appliances having embedded or other web browser functionality.

Game Server GS may provide game downloads or other information downloads.

Chat server C may provide facilities to allow certain gamers to "chat" (communicate) via text messaging, voice messaging, video messaging, or other messaging.

In the exemplary illustrative non-limiting system S shown, the gamer G operating gaming platform P can play a multiplayer game over network N with (at least) two different categories of other gamers: "Friends" F1 . . . FN or "Rivals" R1 . . . RN. In the exemplary illustrative non-limiting example, a "Friend" is someone the gamer G knows personally. A "Rival" is someone the gamer G does not know personally but perhaps has "met" online (e.g., by being matched up by matchmaker server M with that person to play a game previously) and which the gamer G wants to keep track of for future game play.

In the exemplary illustrative non-limiting implementation, system S maintains different lists or rosters for Friends and Rivals, and handles each of those lists or rosters differently while allowing gamer G to selectively play games against Friends, Rivals or both. Additional or different categories of opponents can be provided if desired.

Exemplary Illustrative Non-Limiting Screen Displays

Figure 1A:
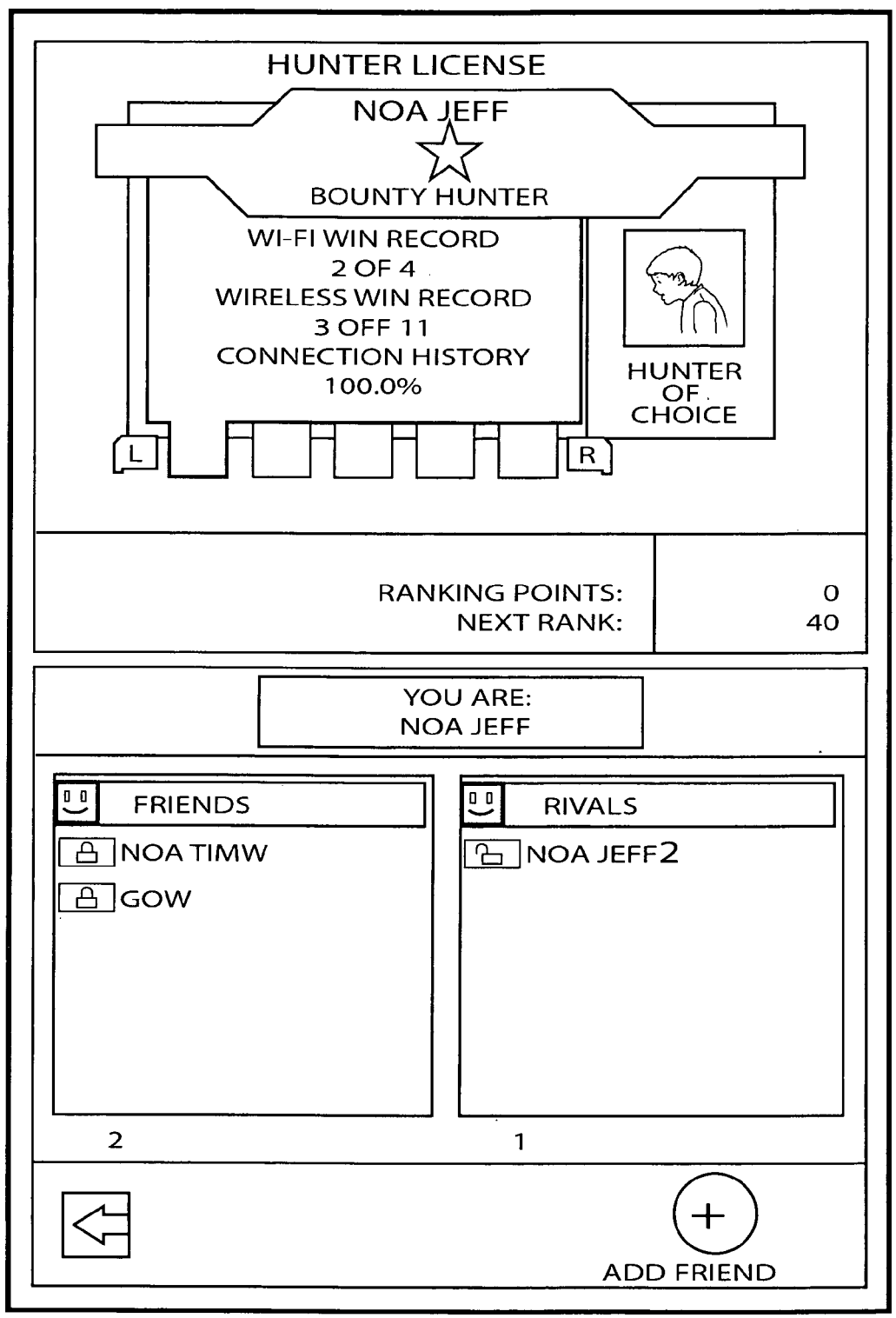
FIG. 1A shows an illustrative non-limiting example of a list (roster) of Friends and Rivals.

FIG. 1A shows an illustrative non-limiting example of a list (roster) of Friends and Rivals. As shown in FIG. 1A, you can view all your friends and rivals you have gotten, as well as delete those you don't want and add more friends through the "Friend Code" system. In the exemplary illustrative non-limiting implementation, this list is offline so you don't need to go online to view it. Your Friends are people you have experience with either through playing a multiplayer networked local game once with them (local players will automatically be added as "Friends" since you met them in person) or through exchanging a "Friend Code". Rivals are added when you play unknown players over the remote network connection, and you both agree to be each other's Rival. Rivals can also be found using "Rival Radar."

Figure 1B:
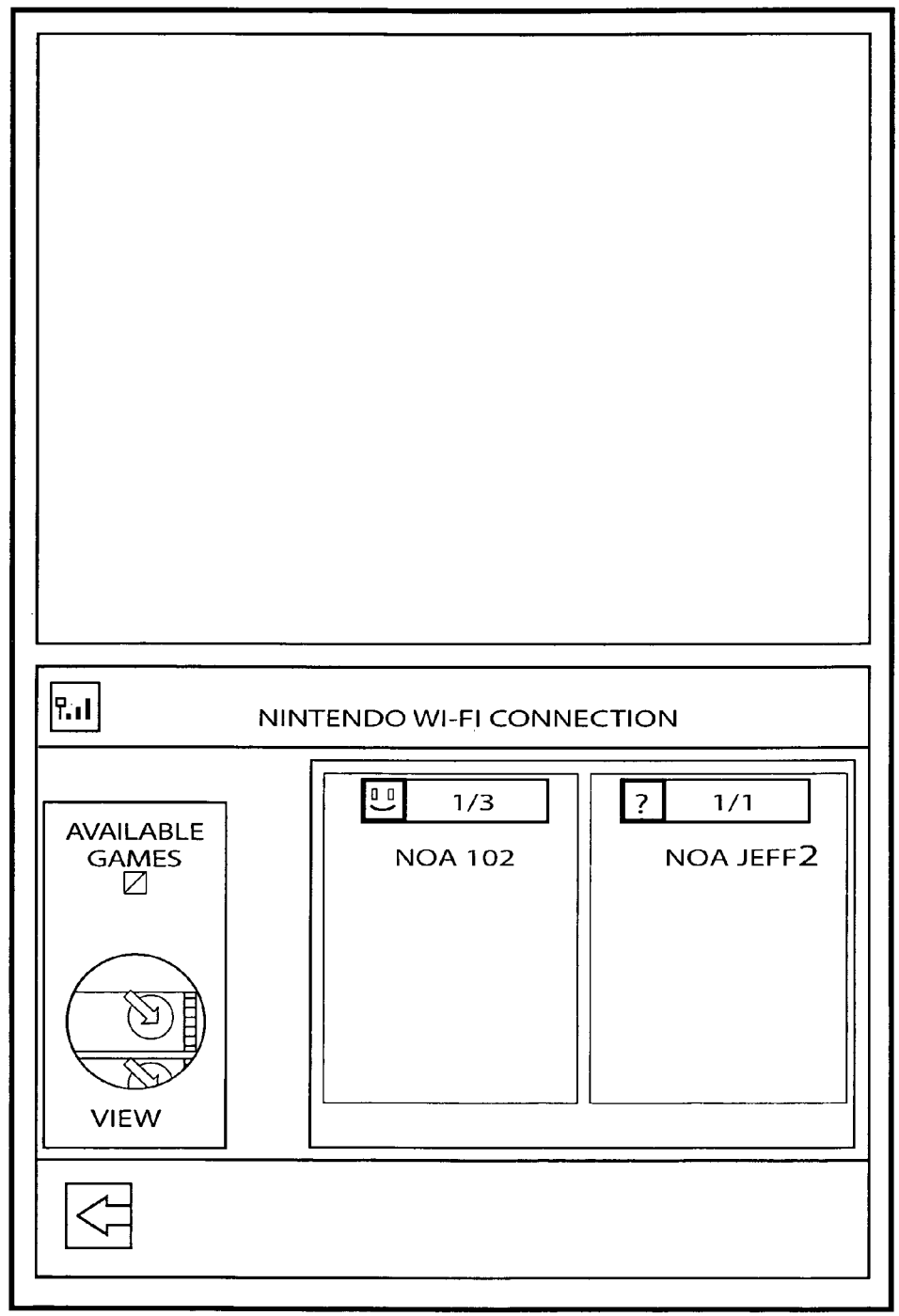
FIG. 1B shows an illustrative non-limiting example of a list (roster) of Friends and Rivals ONLINE.

FIG. 1B shows an illustrative non-limiting example of a list (roster) of Friends and Rivals ONLINE. You access this screen from the Friends and Rival mode of Wi-Fi Connections on exemplary games. You can toggle between this screen and the Available Games Screen.

Figure 1C:
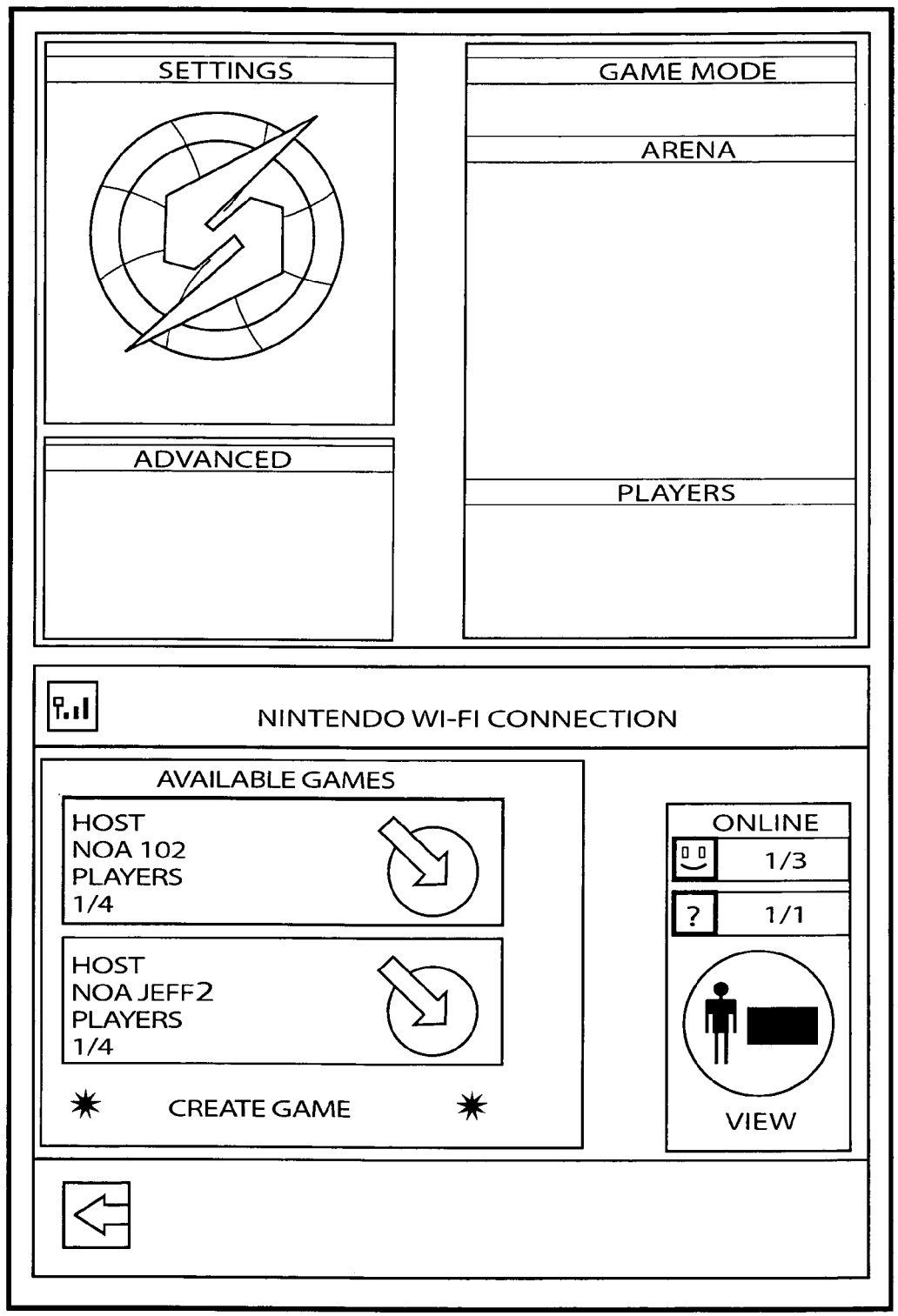
FIG. 1C an illustrative non-limiting example of a list of Available Games ONLINE.

FIG. 1C shows an illustrative non-limiting example of a list of Available Games ONLINE. This is the first screen you will see in the exemplary illustrative non-limiting implementation when you access the Friends and Rival mode of Wi-Fi Connections. You can toggle between this screen and the Friends and Rival ONLINE.

Figure 1D:
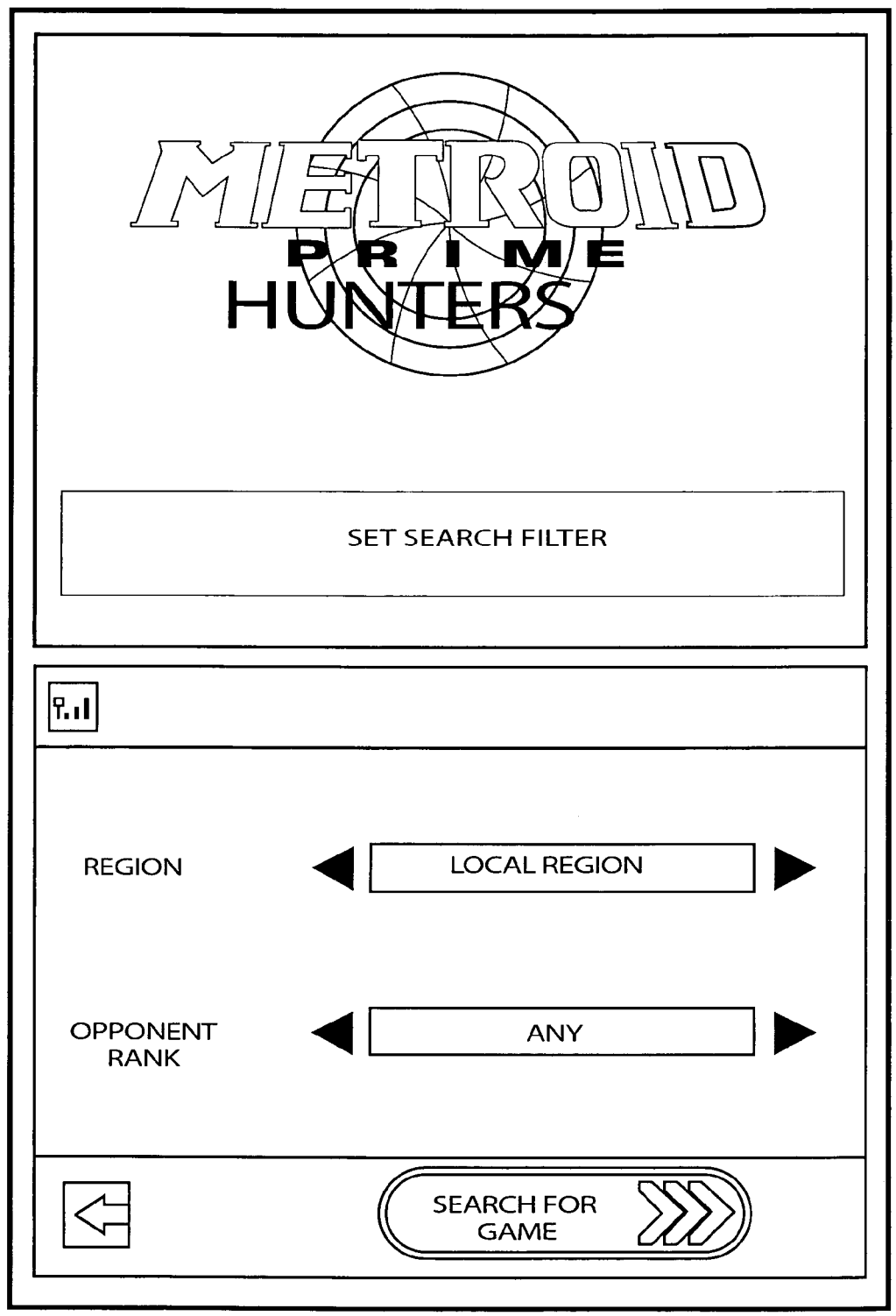
FIG. 1D shows an illustrative non-limiting example of a screen display that appears when you select FIND GAME mode in Wi-Fi Connections.

FIG. 1D shows an illustrative non-limiting example of a screen display that appears when you select FIND GAME mode in Wi-Fi Connections. It allows you to filter the games you want to play online. Most of the players you will play against here will be unknown players online. Once the game is over, you will have an opportunity to make them your Rival.

Figure 1E:
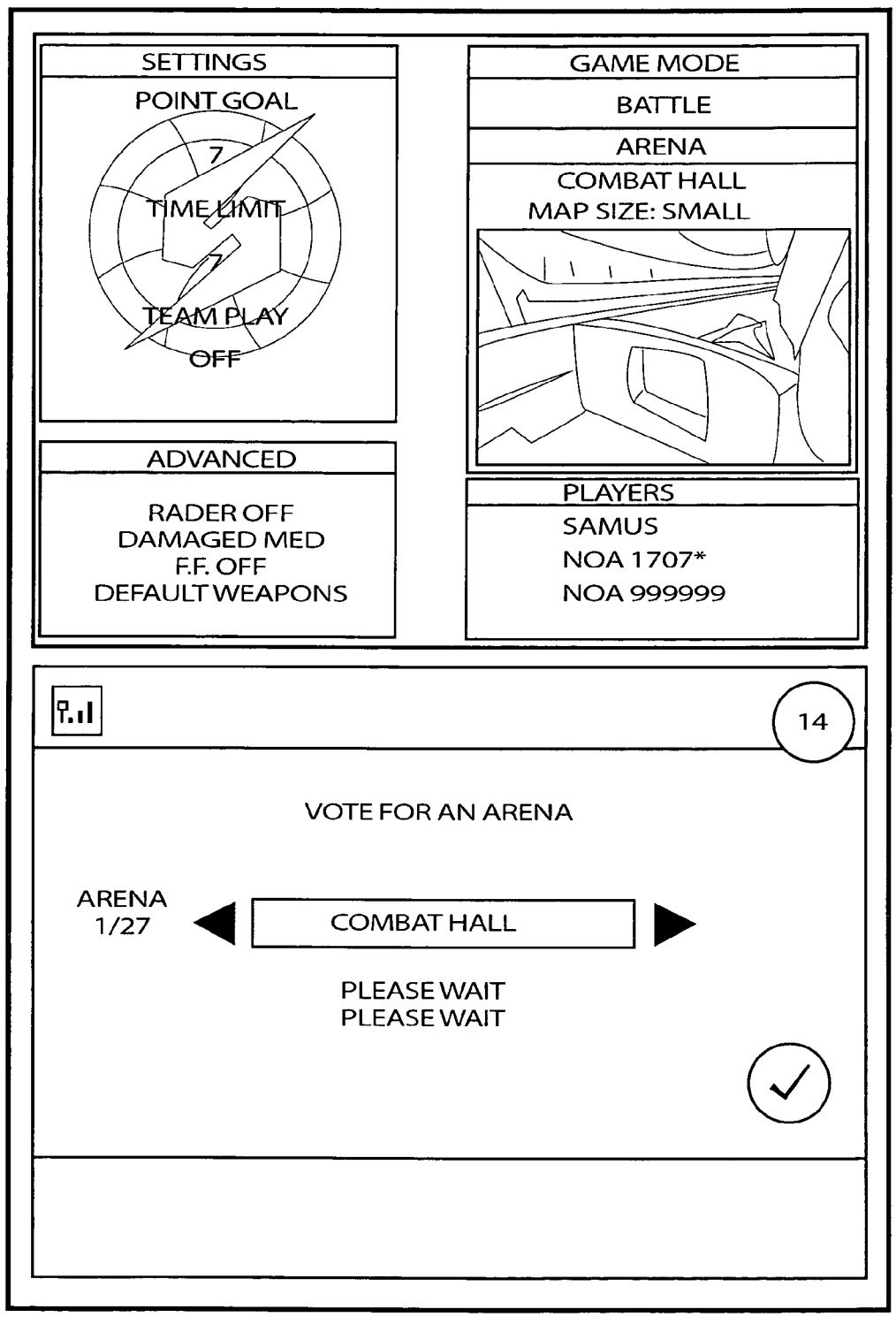
FIG. 1E shows an illustrative non-limiting example of a screen display that appears when you connect to enough players in FIND GAME mode in Wi-Fi Connections and then select your characters.

FIG. 1E shows an illustrative non-limiting example of a screen display that appears when you connect to enough players in FIND GAME mode in Wi-Fi Connections and then select your characters. In the exemplary illustrative non-limiting implementation, all online players can vote to decide what level to play on and the game will select the level.

Figure 1F:
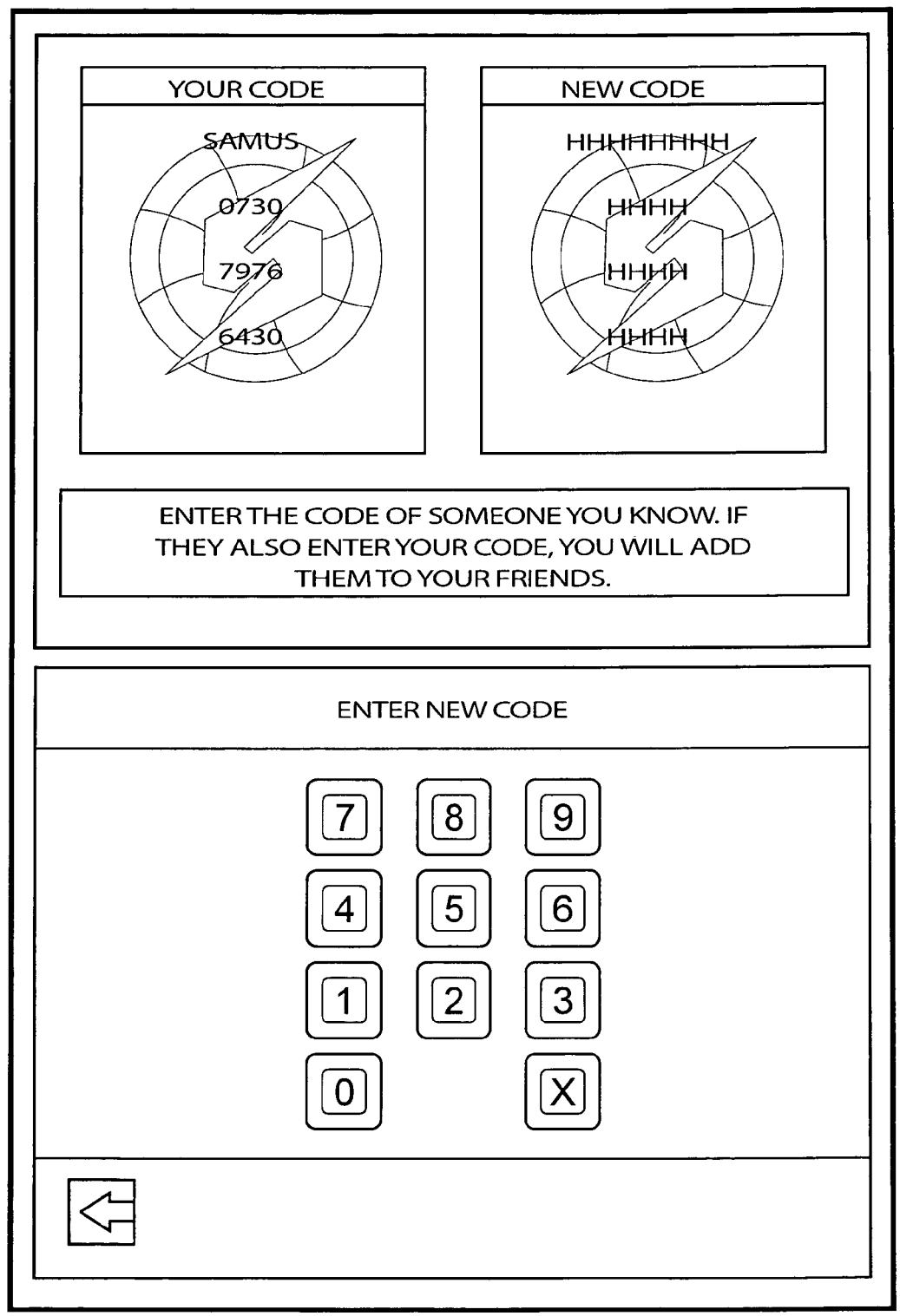
FIG. 1F shows an illustrative non-limiting example of a screen display that appears when you want to add a new Friend to your Friends Roster thru "Friend Code"

FIG. 1F shows an illustrative non-limiting example of a screen display that appears when you want to add a new "Friend" to your "Friends Roster" through exchange of a "Friend Code" (see FIG. 1A). Your Friend Code will appear. You need to tell your friend your code, and you'll need to enter your friend's code. Only then, can you both be "friends."

Figure 1G:
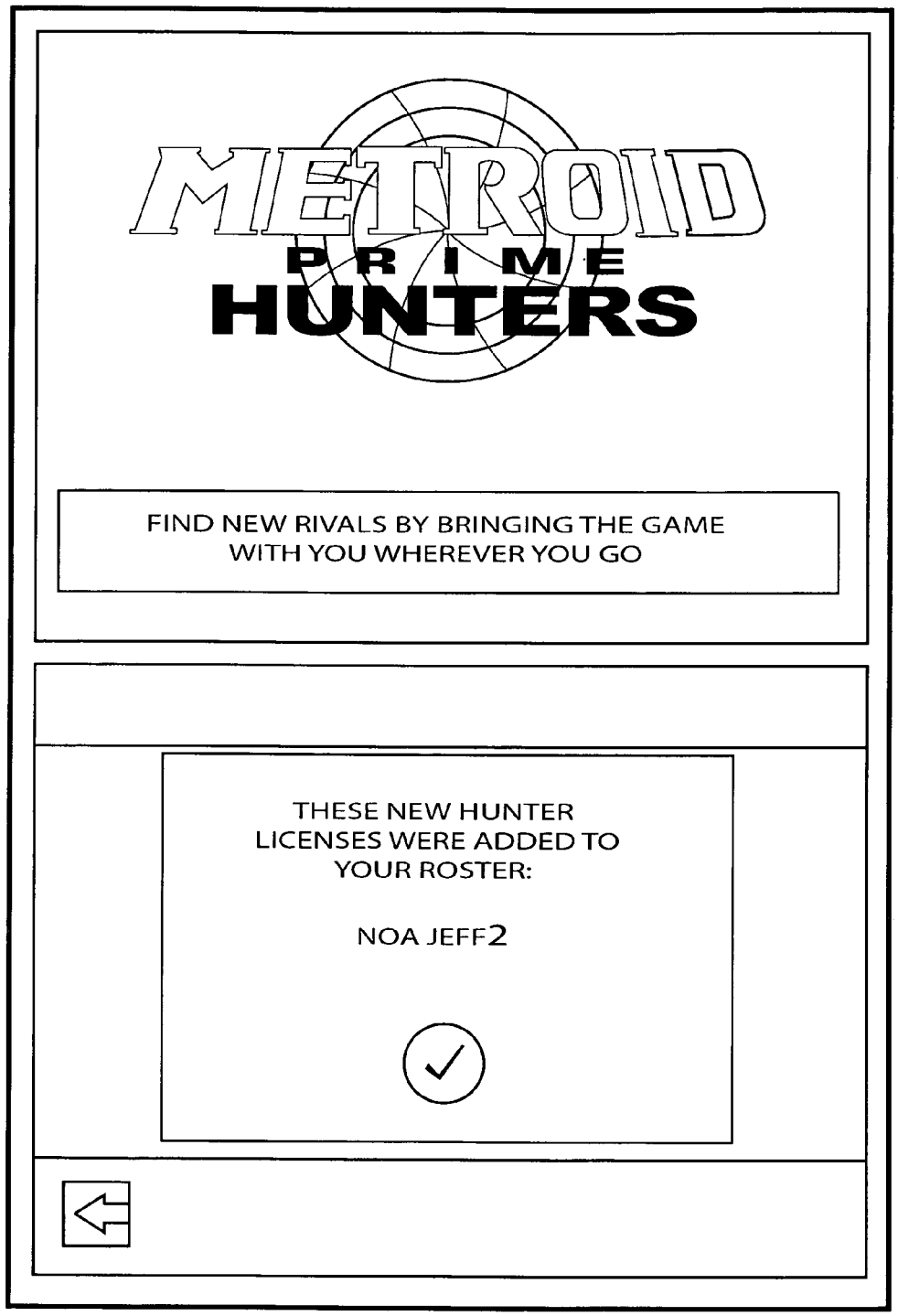
FIG. 1G shows an illustrative non-limiting example of a screen display that appears after you use Rival Radar and manage to connect and find another player using Rival Radar out on the streets.

FIG. 1G shows an illustrative non-limiting example of a screen display that appears after you use Rival Radar, establish a connection and find another player using Rival Radar at a party, in the school yard or out on the streets. You both will be added to each other's Rival Roster. You can later find your Rival (and she can find you) online through Friends and Rival Mode.

Figure 1H:
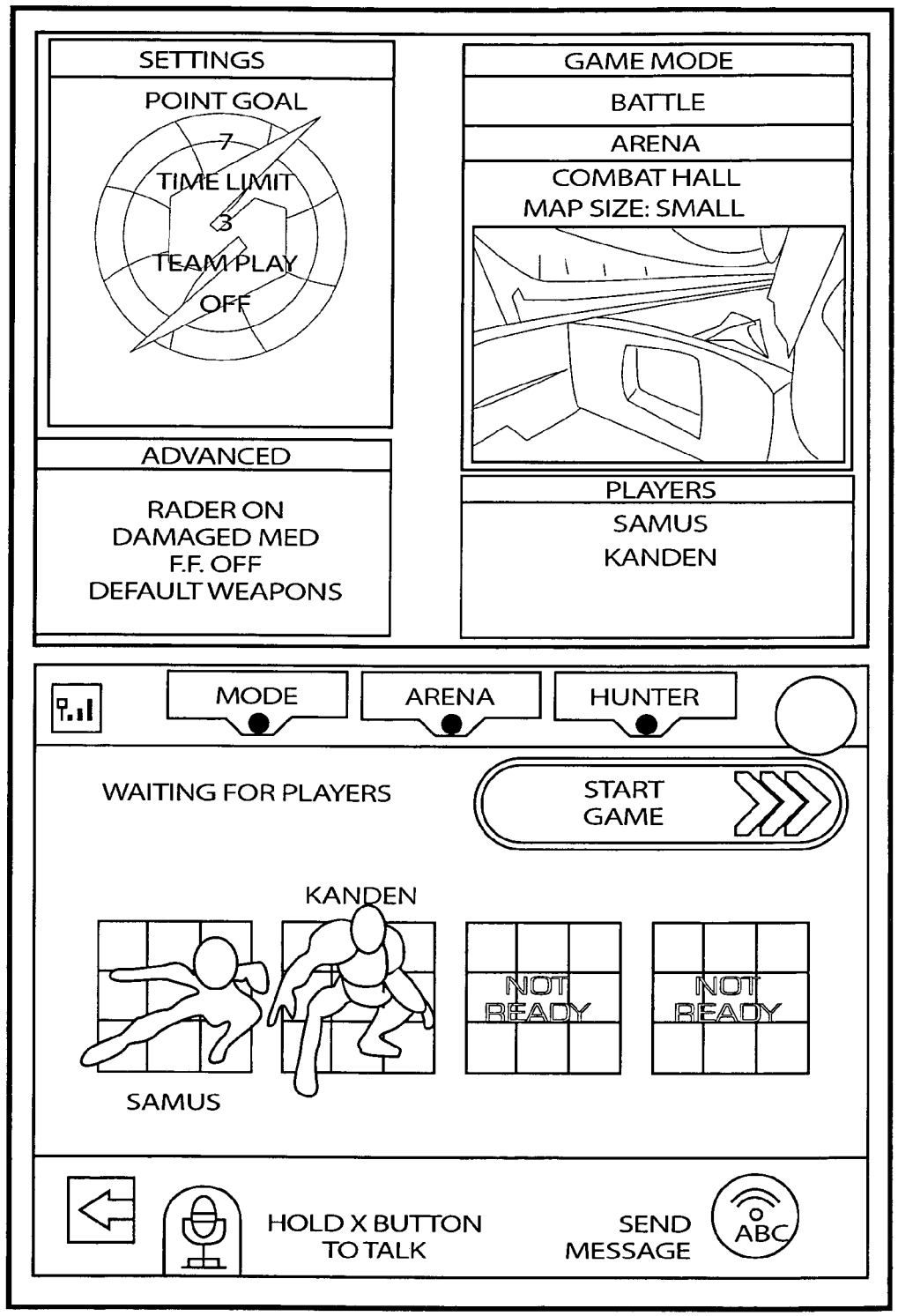
FIG. 1H shows an illustrative non-limiting example of a Character Selection Screen during a Friends and Rival networked game

FIG. 1H shows an illustrative non-limiting example of a Character Selection Screen during a Friends and Rival networked game. This is the HOST version of the screen (in the exemplary illustrative non-limiting implementation, only the HOST can start a game). If a game has at least 2 Friends in the game, then these Friends can voice/text chat with each other. Therefore, the Voice Chat and Text Chat icons are shown. In one exemplary illustrative non-limiting implementation, only Friends can voice/text chat with one another. If this game has only Rivals then these voice/text chat icons will not appear.

Figure 1I:
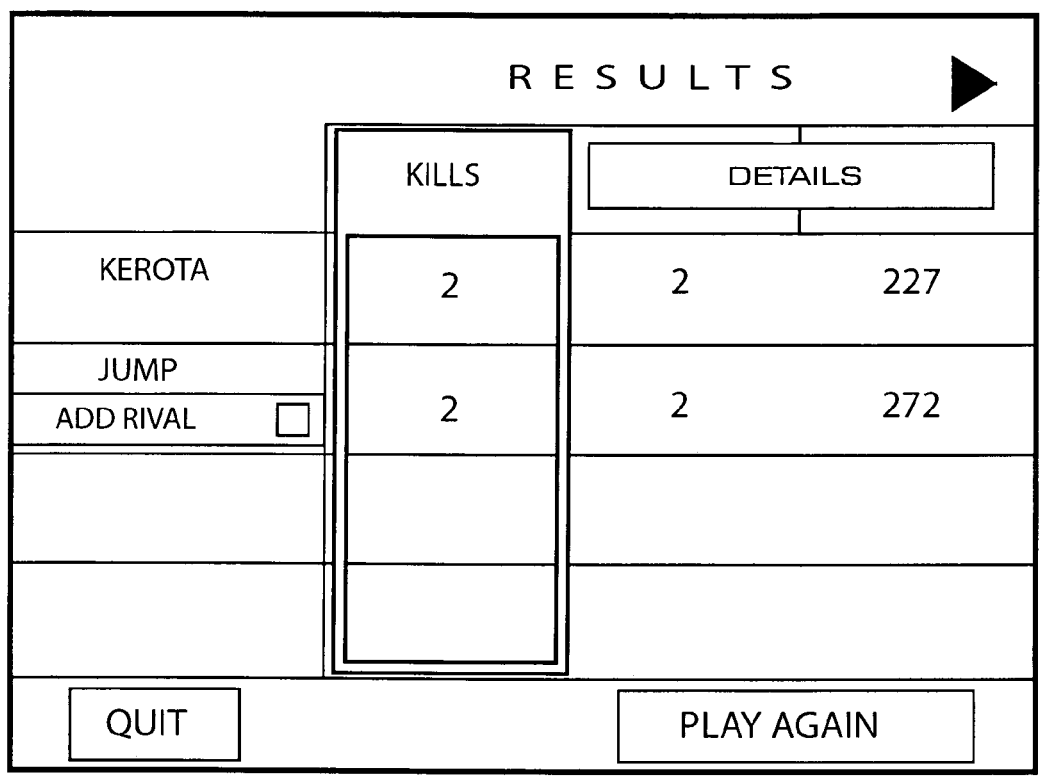
FIG. 1I is an illustrative non-limiting example of a Result Screen display.

FIG. 1I is an illustrative non-limiting example of a Result Screen display. If you played an unknown player, you have the opportunity to "check off" them as a Rival. If they also agree, then you both will become each other's Rival and be added to each other's Rival Roster.

Exemplary Illustrative Non-Limiting Gaming Platform

Figure 2A:
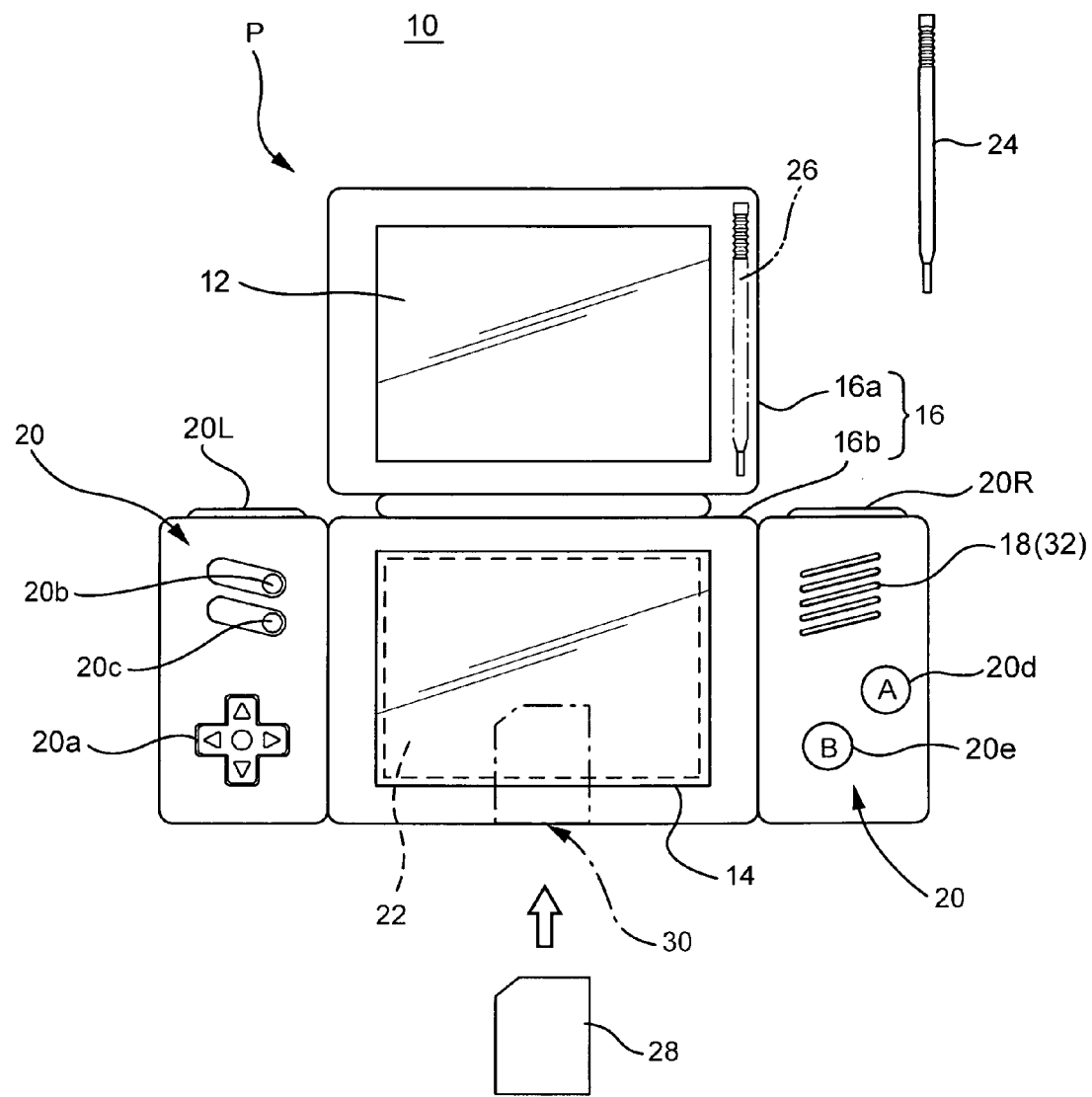
FIG. 2A shows an exemplary illustrative non-limiting game device including a first liquid crystal display and a second liquid crystal display.

Referring to FIG. 2A, a game device P of one exemplary illustrative non-limiting implementation includes a first liquid crystal display (LCD) 12 and a second LCD 14. The LCD 12 and the LCD 14 are provided on a housing 16 so as to be arranged in a predetermined position. In this implementation, the housing 16 consists of an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is used as a display in this implementation, an EL (Electro-Luminescence) display or a plasma display may be used in place of the LCD. Alternatively, a CRT display may be used for game consoles, arcade video game machines, etc.

As can be understood from FIG. 2A, the upper housing 16a has a planar shape a little larger than a planar shape of the LCD 12, and has an opening formed so as to expose a display surface of the LCD 12 from one main surface thereof. The lower housing 16b has a planar shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged. The upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. The switches 20d and 20e are placed at the right of the LCD 14 on the one main surface of the lower housing 16b. Switches 20L and 20R are placed in a part of an upper edge (top surface) of the lower housing 16b and lie on each side of the connected portion with the upper housing 16a.

The direction instructing switch 20a functions as a digital joystick, and is used for instructing a moving direction of a player character (or player object) to be operated by a player, instructing a moving direction of a cursor, and so forth by operating any one of four depression portions. The start switch 20b is formed by a push button, and is used for starting (restarting) a game, temporarily stopping (pausing) a game, and so forth. The select switch 20c is formed by the push button, and used for a game mode selection, etc.

The action switch 20d (that is, the A button) is formed by the push button, and allows the player character to perform an action that is game specific. For example, it may be used for instructing character movement direction, such as hitting (punching), throwing, holding (obtaining), riding, jumping, etc. For example, in an action game, it is possible to apply an instruction of jumping, punching, moving arms, etc. In a role-playing game (RPG) or a simulation RPG, it is possible to apply an instruction of obtaining an item, selecting and determining acts or commands, etc. The action switch 20e (that is, the B button) is provided by a push button, and is used for changing a game mode selected by the select switch 20c, canceling an action determined by the A button 20d, and so forth.

The action switch (left depression button) 20L and the action switch (right depression button) 20R are formed by a push button. The left depression button (L button) 20L and the right depression button (R button) 20R can perform the same operation as the A button 20d and the B button 20e, and also function as a subsidiary of the A button 20d and the B button 20e.

A touch panel 22 is provided on a top surface of the LCD 14. As the touch panel 22, any type of a resistance film system, an optical system (infrared rays system) or an electrostatic capacitive coupling system, for example, can be used. In response to an operation of depressing, stroking or touching with a stick 24, a pen (stylus pen), or a finger (hereinafter, referred to as "stick 24, etc.") on a top surface (detection surface) of the touch panel 22, the touch panel 22 detects coordinates of operating position of the stick 24, etc. and outputs coordinate data corresponding to the detected coordinates.

According to this implementation, the exemplary non-limiting resolution of the display surface of the LCD 14 is 256 dots×192 dots, and a detection accuracy of a detection surface of the touch panel 22 is also rendered 256 dots×192 dots in correspondence to the resolution of the display surface (this is the same or approximately the same as for the LCD 12). Detection accuracy of the detection surface of the touch panel 22, however, may be lower than the resolution of the display surface of the LCD 14, or higher than it. In the detected coordinates of the touch panel 22, a point of origin (0, 0) is on an upper left corner, a right horizontal direction is an X-axis normal direction and a downward vertical direction is a Y-axis normal direction (the same applies to the coordinate system of the LCD 14 (12)). A three-dimensional game space often has X and Y coordinates on the horizontal plane and a Z axis in a vertical direction.

It is possible to display different game images (game screens) on the LCD 12 and the LCD 14. This allows the player to point at (specify) or make active (move) character images displayed on the screen of the LCD 14, such as player characters, enemy characters, item characters, text information and icons, or select a command, by operating the touch panel 22 with the stick 24, etc. This also makes it possible to change an orientation of a virtual camera (viewpoint) provided in the three-dimensional game space or scroll through a game screen (the screen is displayed in a state of being gradually moved).

As stated above, the game device 10 has the LCD 12 and the LCD 14 as a display portion of two screens, and by providing the touch panel 22 on an upper surface of any one of them (LCD 14 in the first embodiment), the game device 10 has the two screens (LCD 12, 14) and the two operating portions (20, 22).

Additionally, in this implementation, the stick 24 can be inserted into a housing portion (housing slot) 26 provided in proximity to a side surface (right side surface) of the upper housing 16a, for example, and taken out therefrom as necessary. In a case of providing no stick 24, it is not necessary to provide the housing portion 26.

The game device 10 further includes a memory card (or game cartridge) 28. The memory card 28 is detachable, and inserted into a loading slot 30 provided on a rear surface or a lower edge (bottom surface) of the lower housing 16b. Although omitted in FIG. 2A, a connector 46 (see FIG. 2B) is provided at a depth portion of the loading slot 30 for connecting a connector (not shown) provided at an end portion of the memory card 28 in the loading direction. When the memory card 28 is loaded into the loading slot 30, the connectors are connected with each other, and therefore, the memory card 28 is accessible by a CPU core 42 (see FIG. 2B) of the game device 10.

A speaker 32 (see FIG. 2B) is provided at a position corresponding to the sound hole 18 inside the lower housing 16b. A battery accommodating box is provided on a rear surface of the lower housing 16b, and a power switch, a volume switch, an external expansion connector, an earphone jack, etc. are provided on a bottom surface of the lower housing 16b.

Figure 2B:
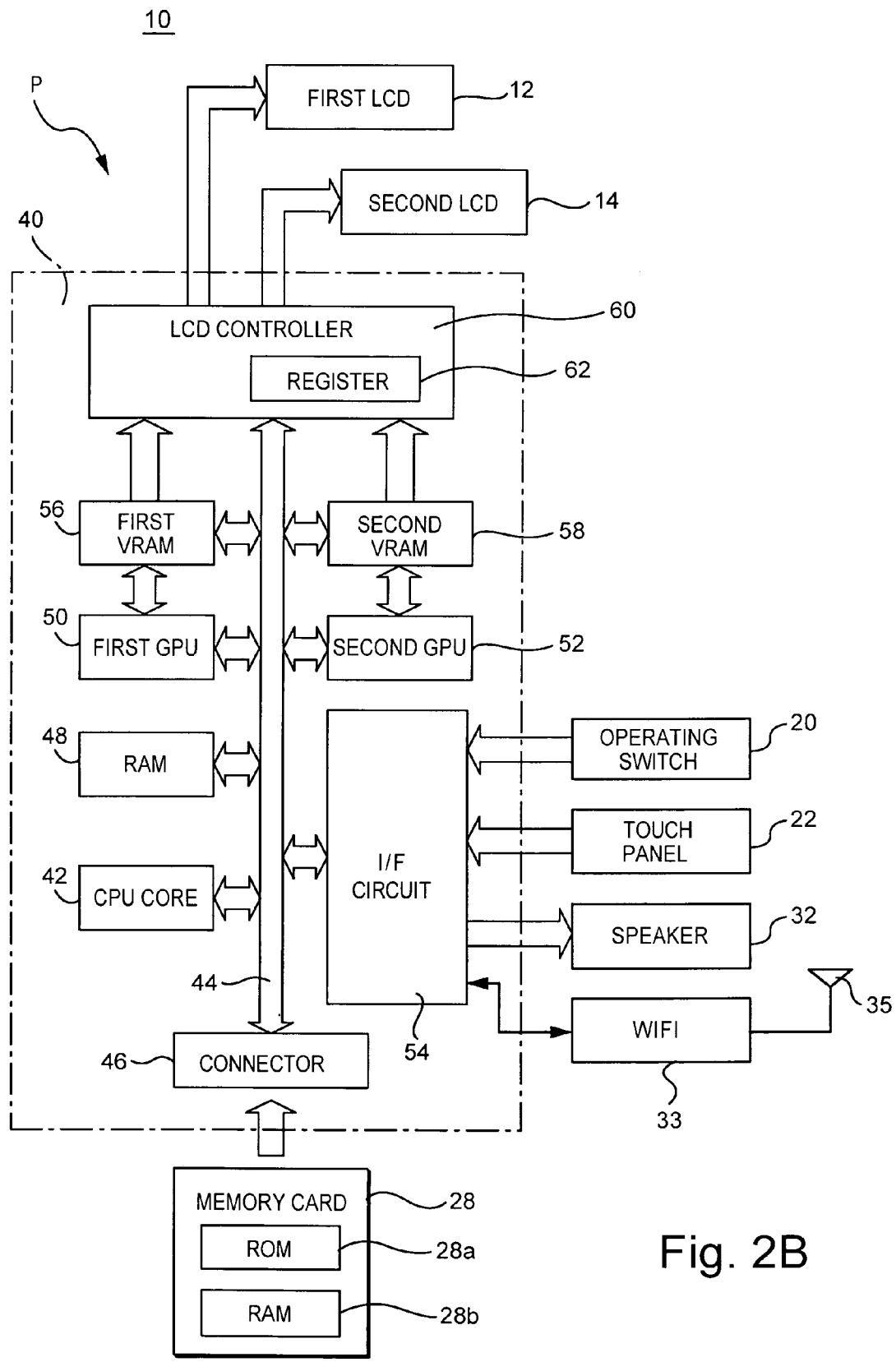
FIG. 2B is a block diagram showing an exemplary illustrative non-limiting electric configuration of the game device 10.

FIG. 2B is a block diagram showing an exemplary illustrative non-limiting electric configuration of the game device 10. Referring to FIG. 2B, the game device 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b. The ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a virtual game to be executed by the game device 10. ROM 28a may also store image data (character image, background image, item image, icon (button) image, message image, etc.), data representing sounds or music used to accompany the game (sound data), etc. The RAM (backup RAM) 28b stores (saves) proceeding data and result data of the game.

The RAM 48 is used as a buffer memory or a working memory. The CPU core 42 loads the game program, the image data, the sound data, etc. stored in the ROM 28a of the memory card 28 into the RAM 48, and executes the loaded game program. The CPU core 42 executes a game process while storing in the RAM 48 data (game data and flag data) temporarily generated in correspondence with progress of the game.

The game program, the image data, the sound data, etc. are loaded from the ROM 28a entirely at a time, or partially and sequentially so as to be stored (loaded) into the RAM 48.

Each of the GPU 50 and the GPU 52 forms a part of a rendering means. They may be provided by, for example, a single chip ASIC. GPU 50, 52 receive graphics commands from the CPU core 42 to generate game image data according to the graphics command. The CPU core 42 provides each of the GPU 50 and the GPU 52 with an image generating program (included in the game program) used to generate the game image data in addition to the graphics command.

GPU 50 is connected with a first video RAM (hereinafter, referred to as "VRAM") 56. GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. The CPU core 42 writes the image data required for graphics drawing into the first VRAM 56 and the second VRAM 58 via the GPU 50 and the GPU 52. The GPU 50 accesses the VRAM 56 to generate the game image data for graphics drawing. GPU 52 accesses the VRAM 58 to generate the game image data for graphics drawing.

The VRAM 56 and the VRAM 58 are connected to the LCD controller 60. The LCD controller 60 includes a register 62. Register 62 consists of, for example, one bit. Register 62 stores a value of "0" or "1" (data value) according to an instruction of the CPU core 42. When the data value of the register 62 is "0", the LCD controller 60 outputs the game image data generated by the GPU 50 to the LCD 12, and outputs the game image data generated by the GPU 52 to the LCD 14. When the data value of the register 62 is "1", the LCD controller 60 outputs the game image data generated by the GPU 50 to the LCD 14, and outputs the game image data generated by the GPU 52 to the LCD 12.

The LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22 and the speaker 32. Operating switch 20 is the above-described switches 20a, 20b, 20c, 20d, 20e, 20L and 20R. In response to an operation of the operating switch 20, a corresponding operation signal (operation data) is input to the CPU core 42 via the I/F circuit 54. The coordinates position data from the touch panel 22 is input to the CPU core 42 via the I/F circuit 54. The CPU core 42 reads-out the sound data necessary for the game such as a game music (BGM), a sound effect or voices of a game character (onomatopoeic sound), etc. from the RAM 48, and outputs it from the speaker 32 via the I/F circuit 54.

FIG. 2B further shows a "Wi-Fi" wireless adapter 33 and associated antenna 35. Wi-Fi wireless adapter 33 comprises a transceiver (transmitter and receiver) that allows gaming platform P to communicate wirelessly via network N. Wi-Fi wireless adapter 33 may comprise for example a baseband system, modulator and amplifiers compliant with the conventional 802.11 standard. Wi-Fi wireless adapter 33 wirelessly receives information transmitted over RF from other devices, and wirelessly sends information to other devices. Other wired or wireless technology (e.g., Ethernet, WAN, Bluetooth, etc.) could be substituted. Wireless adapter 33 allows gaming platform P to communicate with other gaming platforms or other devices in the same room or vicinity and/or with more remote devices. Network N could be a very localized network such as a 20-meter range WI-FI ad hoc connection, or it could be a worldwide network such as the Internet, or any other wired or wireless network you can think of.

Figure 3:
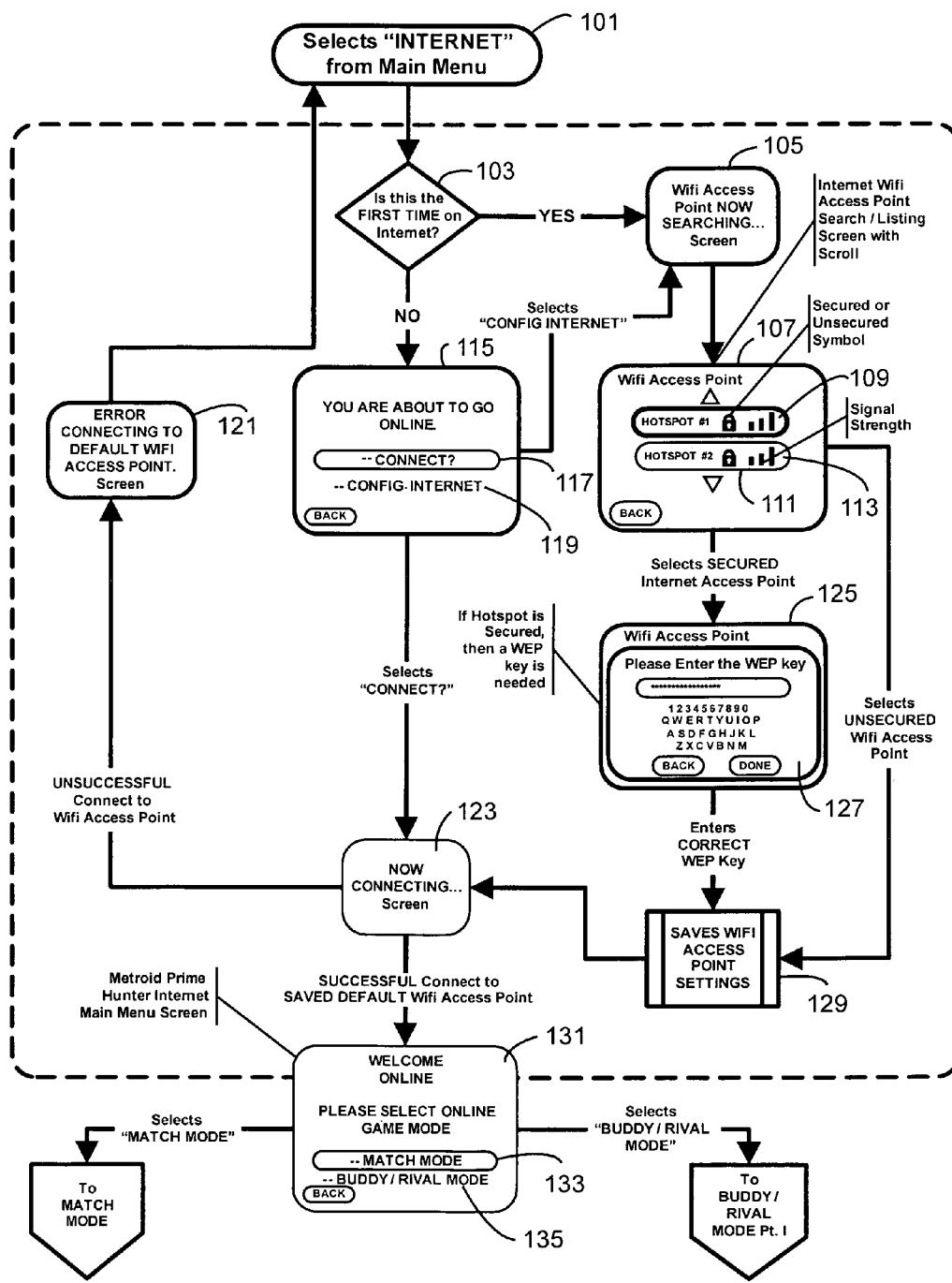
FIG. 3 shows an exemplary flow of an illustrative non-limiting Internet main menu routine.

Exemplary Illustrative Non-Limiting Software Controlled Operation—Internet Connection In an exemplary non-limiting implementation, a player using gaming platform P will select an option, such as "Internet" or "Wi-Fi" from a menu (not shown) to connect to a network. This selection may cause a program to run a main menu routine, an exemplary flow for which is shown in FIG. 3. According to this exemplary, illustrative non-limiting implementation, the program may determine (at block 103) if this is the first time the player is connecting to the selected network. If the player is connecting for the first time, the program will search 105 for available networks. For example, if a wireless connection is desired, the program may display 107 a list of available access points. The program may also display information 109 about available access points or "hot spots." This information may include, among other things, information about whether or not the access point is secured 111 and signal strength of the access point 113. If more than one access point is available, the player may be able to select a preferred access point, or, alternatively the program may automatically select an appropriate access point.

If a secured access point is selected 125, the program may request 127 that the player input an access key such as a WEP ("Wireless Encryption Privacy") key. After entry of the appropriate security key, the program may save (block 129) the settings for that access point. If an unsecured access point is selected, the program will bypass any security key requests and also save (at block 129) the settings for that access point. The program then may proceed to notify the player that it is attempting to connect to the selected network (block 123).

If a player has previously connected to the selected network, the program may skip the searching step and proceed to a connect/configure screen 115. This screen may provide the player with one or more options, such as connect 117, configure 119, and any other suitable options. If the player selects "configure" 119, the program may proceed to search (block 105) for available networks and continue as if the player had not previously connected to a network. If the player selects "connect" 117, the program may use the existing network settings and notify (at block 123) the player that the program is connecting to the desired network.

If connection is successful, the program may then display a welcome screen 131 with one or more game play options, such as tournament mode 133, buddy mode 135, and any other desired options. Depending on which option the player selects, the game will proceed to an appropriate state. If an error occurs in the connection process, the program may notify (at block 121) the player that there was an error in connection, and return to a main menu.

Figure 4:
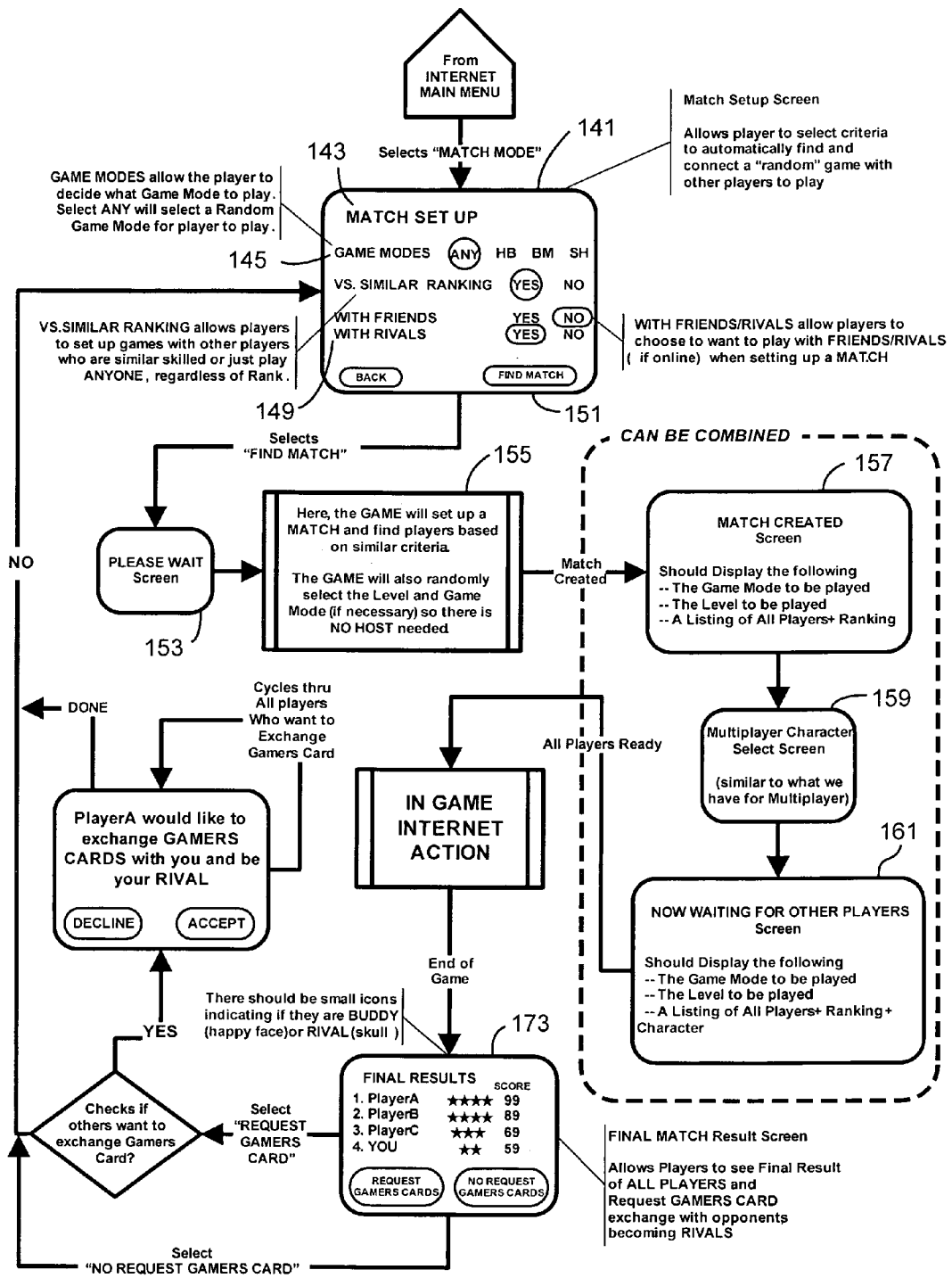
FIG. 4 shows an exemplary flow of an illustrative non-limiting tournament routine.

If tournament mode is available, then the exemplary illustrative non-limiting implementation may run a tournament mode routine. An exemplary flow of such a routine is shown in FIG. 4. The routine may first display a tournament mode menu screen 141. This screen may display one or more options for the selected tournament, such as a number of matches 143, a game mode 145, an opponent level 147, an option to select buddies/rivals 149, and any other suitable options. Once the player has selected the desired settings, the player may then select an option 151 to find an appropriate match.

After the player has selected the option 151 to find a match, the program may display a "please wait" screen (block 153). While the player waits, the program sets up (at block 155) a tournament based on the selected criteria. Once the program creates the tournament, the program may then display (at block 157) a tournament created screen. Additionally, the program may display (at block 159) a screen allowing the player to select a specific avatar or character to use within the game. The program then waits (at block 161) for other players. While the program waits (block 161), it may display information about the upcoming tournament, such as the game mode and level to be played, a listing of the players in the upcoming match, what, if any, matches those players are currently involved in, and any other suitable information.

Once all of the players are ready, the program may then proceed to in game action (block 169), allowing the players to play their tournament. At the end of the tournament, the program may display (at block 165) a result screen. Among other things, this screen can have information such as a particular player's personal results, the tournament standing of all the players involved, and the individual results of all of the players from the previous game.

After displaying (at block 165) the appropriate information about the previous game, the program checks (at block 167) to see if any games are remaining in the tournament, If there are games remaining, the program may decide (at block 163) whether or not to allow the player to select a new avatar or character for the next game. If a new character can be selected, the program may display (at block 159) a character selection screen. Otherwise, the program may wait (at block 161) for other players to be ready for the next game.

If the program determines (at block 167) that the tournament is over, it may then display (at block 171) a final results screen. This screen may contain a listing of all the players in the tournament along with information for each player, such as score and ranking. This screen may also make it possible for the player to select (at block 173) a particular opponent and provide the player with an option (at block 177) to make that opponent a rival.

Figure 5:
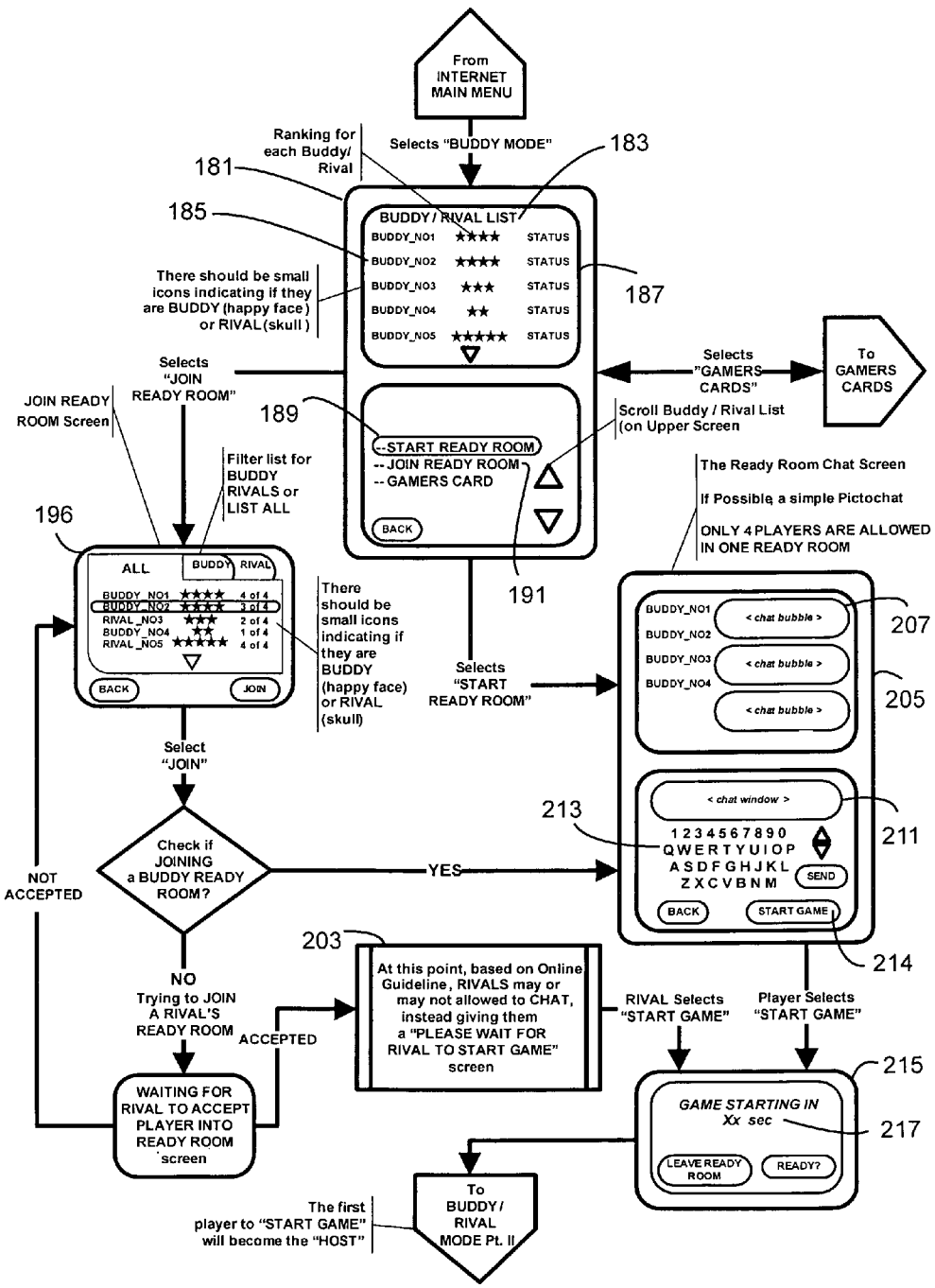
FIG. 5 shows an exemplary flow of an illustrative non-limiting opponent selection routine.

If instead of tournament mode, the player selected buddy mode, then according to this exemplary illustrative non-limiting implementation the program may run an opponent selection routine, an exemplary flow for which is shown in FIG. 5. The program then displays a buddy mode menu screen 181. This screen 181 may display buddy information, such as buddy names 185, buddy rankings 183, the current status 187 of a buddy, and any other appropriate information. The status 187 of a buddy can be "offline" if the buddy is not connected, "online" if the buddy is connected, "busy" if the buddy is currently playing a game, "ready room" if the buddy is currently in a virtual "ready room" waiting for a game to start, or any other suitable status.

In addition to buddy information, the program may give the player a list of options for game play. In this exemplary illustrative non-limiting implementation, the list contains four options: "start ready room" 189, "join ready room" 191, "buddy cards" 193, and "rivals list" 195. Other suitable options may be included.

If the player selects "start ready room" 189 in the exemplary illustrative non-limiting implementation, the program may then display a "ready room" menu screen 205. This screen 205 may contain, among other things, a list of buddy names 209, chat bubbles 207 for each buddy name, a chat typing window 211 and a virtual keypad 213 for chatting. If the player wants to chat with a buddy who is a friend and is known to the player, the player can type a message into the chat typing window 211 using the virtual keypad 213. The player will see any responses to the message appear in one or more of the chat bubbles 207 corresponding to the buddies 209 in the ready room. In one exemplary, illustrative non-limiting implementation, chat is limited to between friends. All players in the ready room may have the option 214 to instruct the game to start, and the game begins when one of the players selects this option 214. At that point the program may display a message 215 that the game is starting. In order to give everyone time to prepare, this message 215 may include a timer 217 that counts down to game play. According to this exemplary illustrative non-limiting implementation, the player to select the start game option 214 will be the host for that game.

If, from the buddy mode screen, the player elects to join a ready room 191, the game may display a list 196 of buddies 198 who are currently in ready rooms. The player may then select one of the buddies 198 and join the same room as that buddy is currently in. If the buddy is in a room that is full, the game may not allow the player to join that room. Alternatively, the game may not even display the names of buddies who are in rooms that are currently full. Once the player elects to join a room, the program may display a ready room menu screen 205.

If the player instead selects from the buddy mode screen "rivals list" 195, the program may display a list 197 of rivals 199 who are currently in ready rooms. The player can select a rival and try to join the ready room that the rival is in. After the player attempts to join, the player's machine may wait 201 to see if that player is accepted. If the player is accepted, then the game may display a message 215 that the game is starting. In the exemplary illustrative non-limiting implementation, players are not able to chat with rivals because rivals are other players whom that player does not know in real life and therefore contact is restricted for safety and privacy reasons.

Figure 6:
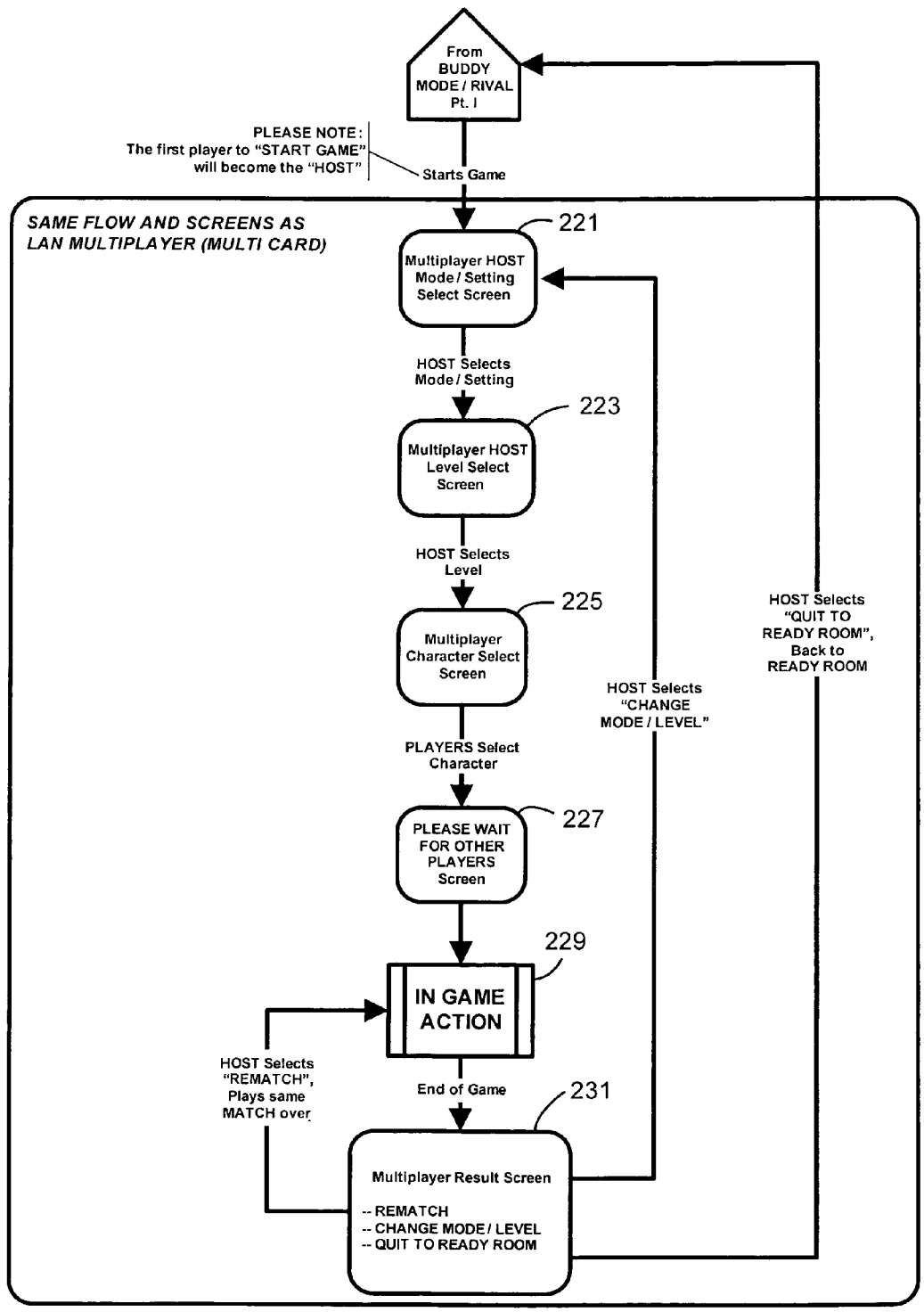
FIG. 6 shows an exemplary flow of an illustrative non-limiting in game routine.

Once a player has elected to begin game play and any counter has expired, the program may then begin a game sequence flow, an example of which is shown in FIG. 6. The program may provide 221 the host player with a list of selectable settings. The program may also provide 223 the host player with a list of levels. The program may further provide 225 all players with a choice of avatar or character for the game. After each player has selected a character, the program may instruct the player to wait for the other players to finish making their selections. The game then proceeds 229, and at the end of the game the program may display 231 a result screen. This screen may give the host the option to play a rematch of the previous game, in which case the game would begin again, or this screen may provide an option to quit to the ready room. Other suitable options may also be provided.

Figure 7A:
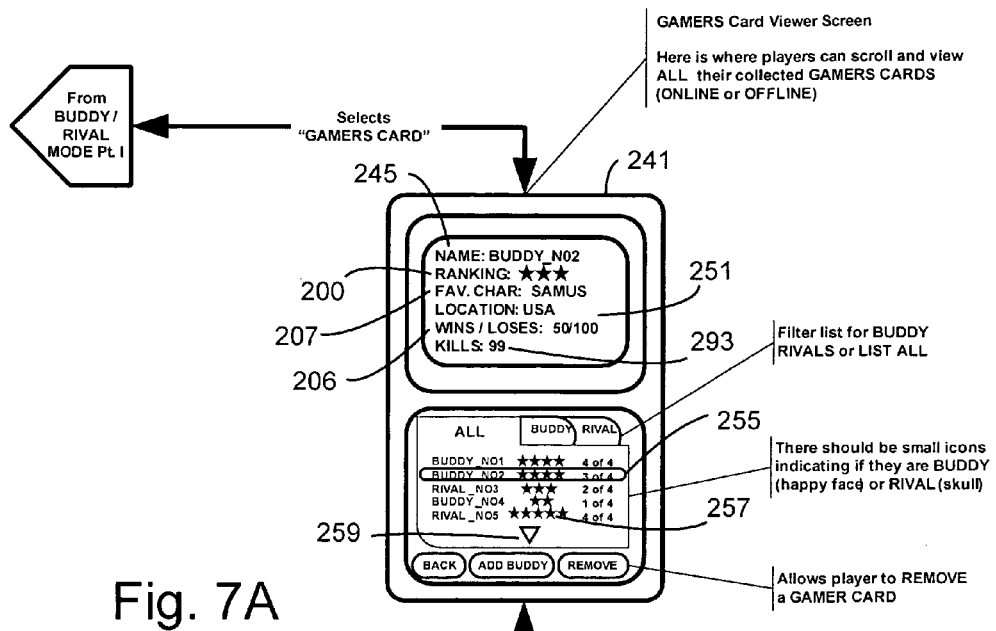
FIG. 7a shows an exemplary flow of an illustrative non-limiting buddy card menu routine.

If a player wishes to add a new buddy to his buddy list, the player may select an appropriate option, such as the "buddy cards" option 193. This may then cause a buddy card menu 241, an exemplary flow for which is shown in FIG. 7a, to appear. The player may select any buddy 255, and scroll through the list of available buddies using arrows 259. The menu may also display the ranking 257 of each buddy 255.

Once a player selects a particular buddy 255, the menu may also display various data about the selected buddy. In one exemplary illustrative non-limiting implementation, the menu displays the name of the buddy 243, the ranking of the buddy 245, the favorite character or avatar used by the buddy 247, the location of the buddy 249, the win/loss ratio of the buddy 251, and the number of kills made by the buddy 253. Any suitable information may further be displayed.

The player may also elect to add a buddy. This can be accomplished through several different methods. If a player plays a local area network (LAN) game with another player, then the two players can simply add each other as buddies, since they have to be in close proximity, and thus know each other, to play a LAN game.

If the players cannot meet to exchange cards, but would still like to be buddies, the players can use the add buddy feature 260 that may be included with the buddy list menu 241. Selection of this feature will launch an add buddy menu, such as the menus shown in FIGS. 7b and 7c.

Figure 7B:
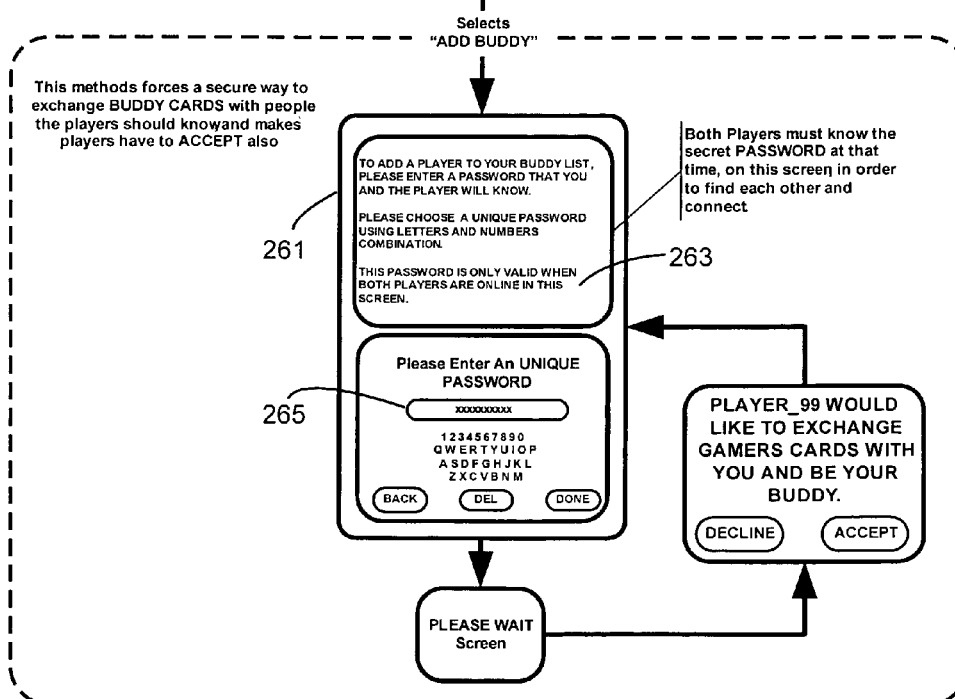
FIGS. 7b and 7c show exemplary representations of illustrative non-limiting possible add buddy menus.

FIG. 7b shows one illustrative exemplary non-limiting implementation of an add buddy menu 261. The menu may include a set of instructions 263. In this exemplary implementation, both buddies use a password that they have mutually agreed on. The buddies must both know the password, and so must agree on it by use of some other medium, such as in person, by phone, by email, by instant messenger, etc. Once the buddies have determined a password, the buddies then both go online. Both buddies then enter the agreed upon password 265. Once both have entered the password, an accept/decline option 273 may pop up. The buddies can then choose if they actually want to add each other to their respective buddy lists. Alternatively, the players may simply be added to each other's buddy lists once the codes are entered, without the additional accept/decline option.

Figure 7C:
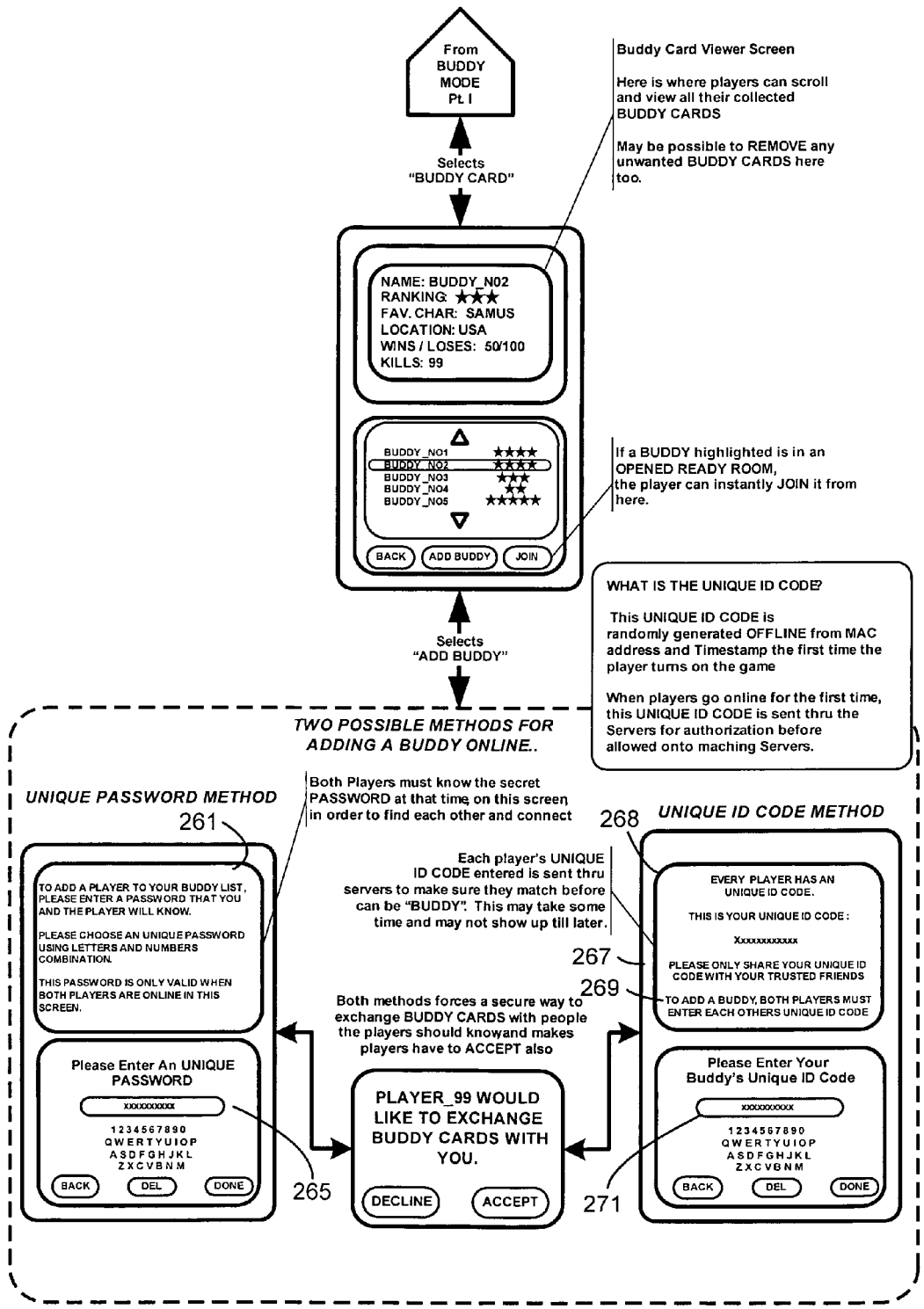

FIG. 7c shows a different illustrative exemplary non-limiting implementation of an add buddy menu 267. According to this exemplary implementation, each player is assigned a unique ID code 268. If a player_1 wants to add a player_2 to his buddy list, then player_1 must know player_2's ID code 268. Because mutuality of acceptance is required, player_2 must also know player_1's ID code. Both players enter the other player's ID code, and then an accept/decline option 273 may pop up. Alternatively, the players may simply be added to each other's buddy lists once the codes are entered, without the additional accept/decline option.

Figure 8:
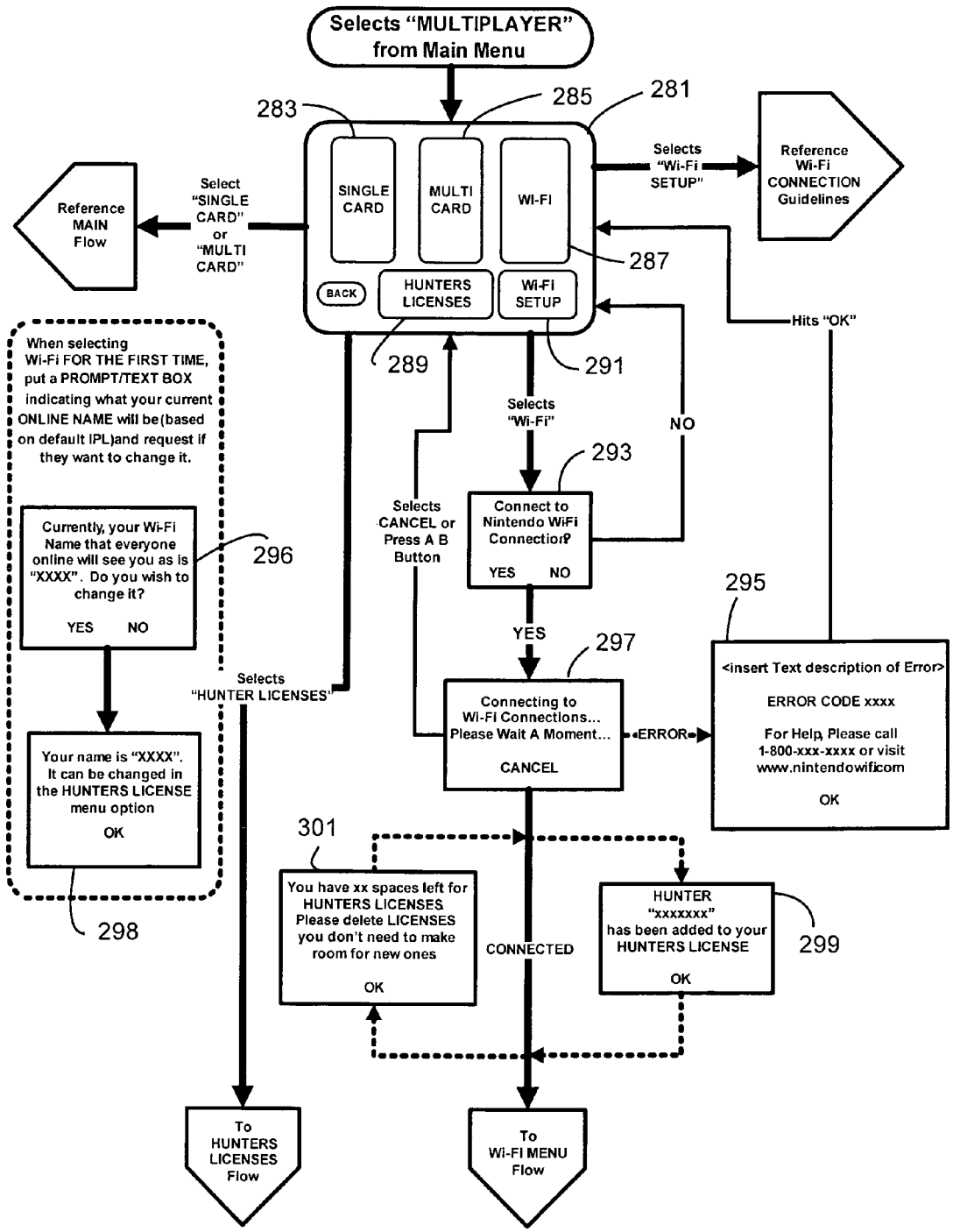
FIG. 8 shows an exemplary flow of an illustrative non-limiting multi-player routine.

Exemplary Illustrative Non-Limiting Software Controlled Operation—Internet Connection According to a further exemplary illustrative non-limiting implementation, a player may choose to enter a multi-player wireless (Wi-Fi) mode. FIG. 8 shows an exemplary flow for this mode. Upon selecting multiplayer from a main menu, the player may be presented with a multi-player menu 281. This menu 281 can include single card 283, multi-card 285, Wi-Fi 287, hunter's licenses 289, and Wi-Fi setup 291. Additional options may be included if desired by the programmer and listed options may not all be needed or added.

Figure 9:
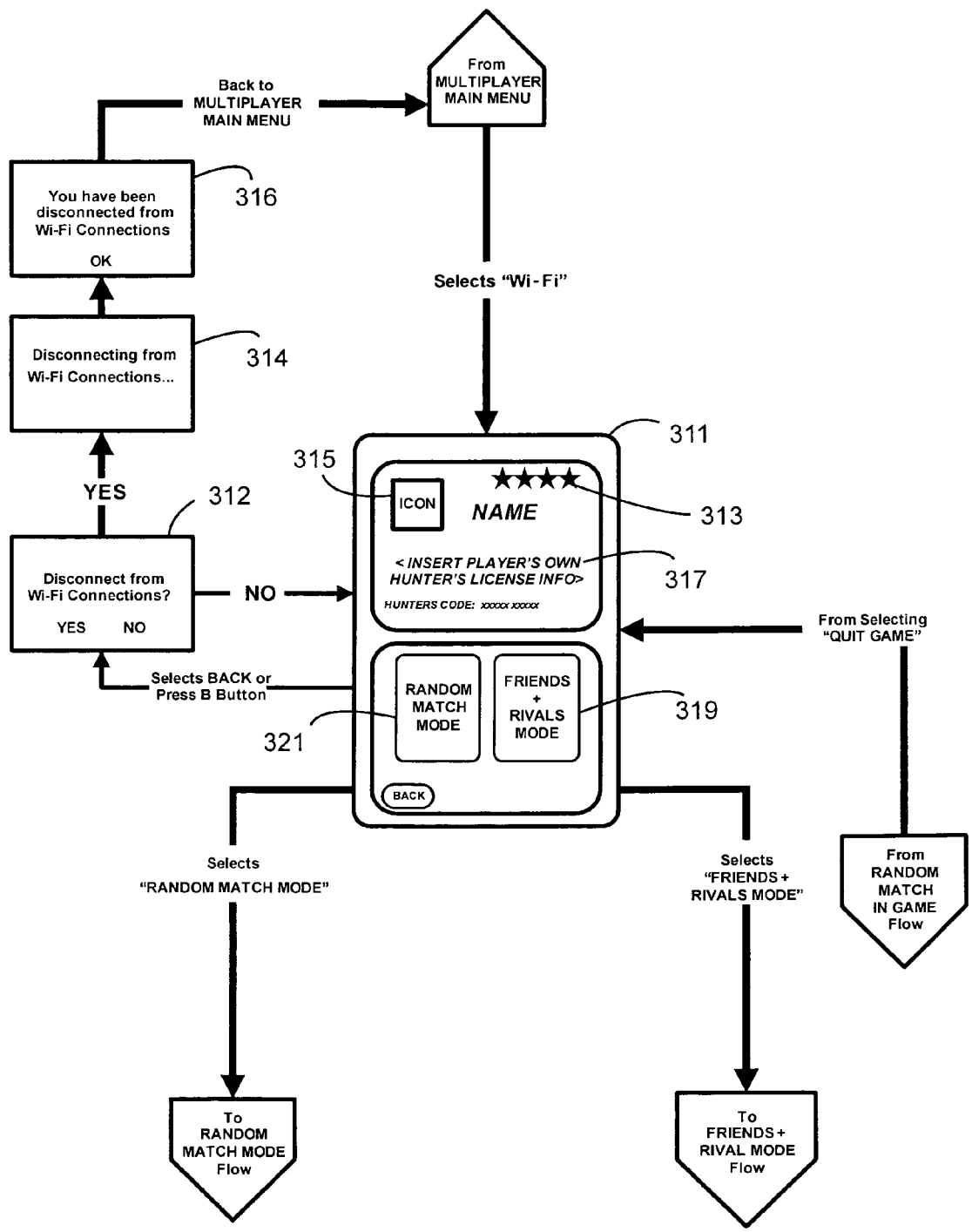
FIG. 9 shows an exemplary flow of an illustrative non-limiting Wi-Fi menu routine.

According to this exemplary implementation, if the player selects Wi-Fi 287, the program may then ask 293 if the player wants to connect to an available Wi-Fi connection. If the player chooses no, the program will return to the menu 281. If the player selects yes, an wait-for-connection message 297 may be displayed as the game device connects to an available Wi-Fi connection. If the device is unable to connect, an error message 295 may be displayed, and the program then returns to the menu 281. Otherwise, if the device is able to connect, it may then proceed to a Wi-Fi menu 311, an exemplary flow for which is shown in FIG. 9. Before displaying the menu 311, however, the program may populate a list or roster of the other players currently connected to the same Wi-Fi connection. When populating the list, it may gather and add 299 the hunter's license information for all online players to the selecting player's device. While this procedure is processing, the program may prompt 301 the player to remove unwanted licenses to make room for new licenses.

The program may then provide the player with a Wi-Fi menu. The menu may display information about the player's own hunter's license, such as the player's rank 313, the player's information 317, and an icon 315 for the player. Other suitable information may also be displayed. The player may also be given one or more options for match-type selection, such as random mode 321 and friends/rivals mode 319. If the player elects to go back to the multi-player main menu, a prompt 312 may appear asking the player if he wishes to disconnect. If the player does wish to disconnect, a message 314 may appear while disconnecting, and then another message 316 may appear, letting the player know the disconnect was successful.

Figure 10:
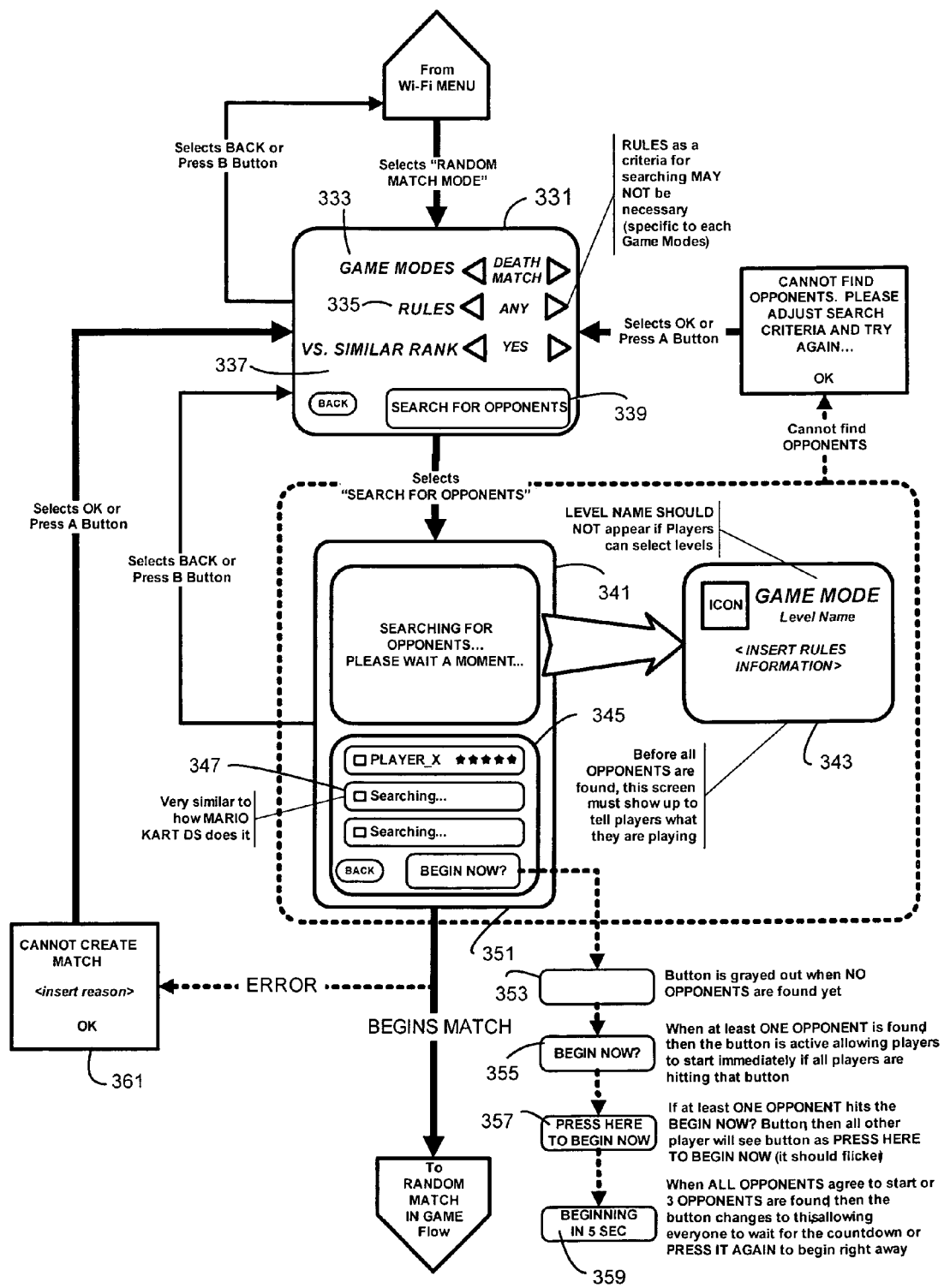
FIG. 10 shows an exemplary flow of an illustrative non-limiting random match setup routine.

If a player selects random mode 321, the program may display a random match setup menu 331, the exemplary flow for which is shown in FIG. 10. This menu 331 may include a variety of options for match set-up, including game modes 333, rules 335 and enemy rank 337. Other suitable options may be included as desired by a programmer or designer. Once a player has appropriately adjusted the available options, he can select an option 339 to find opponents looking to play a similarly configured match.

Once the player has elected to search for possible opponents, a searching menu 341 may be displayed. The searching menu may display information 342 on which selections were made in the random match set-up menu 331, and it may also display a list of found opponents 345 and opponents 347 for whom it is still searching. Once at least one opponent is found, the program may present the player with an option 351 to begin the match. The program may initially display this option 351 as a grayed-out option 353, and only make the option available 355 when at least one opponent is found. If either the player or any of his opponents selects the begin option 355, then the option becomes a flickering/flashing option 357 on the devices of the other players/opponents who did not select the option. Once all players have selected the begin option 355, the option may change to display 359 a countdown to game inception. If for some reason the game cannot create the desired match, it may display an error message 361, and return to the random match set-up menu 331.

Figure 11:
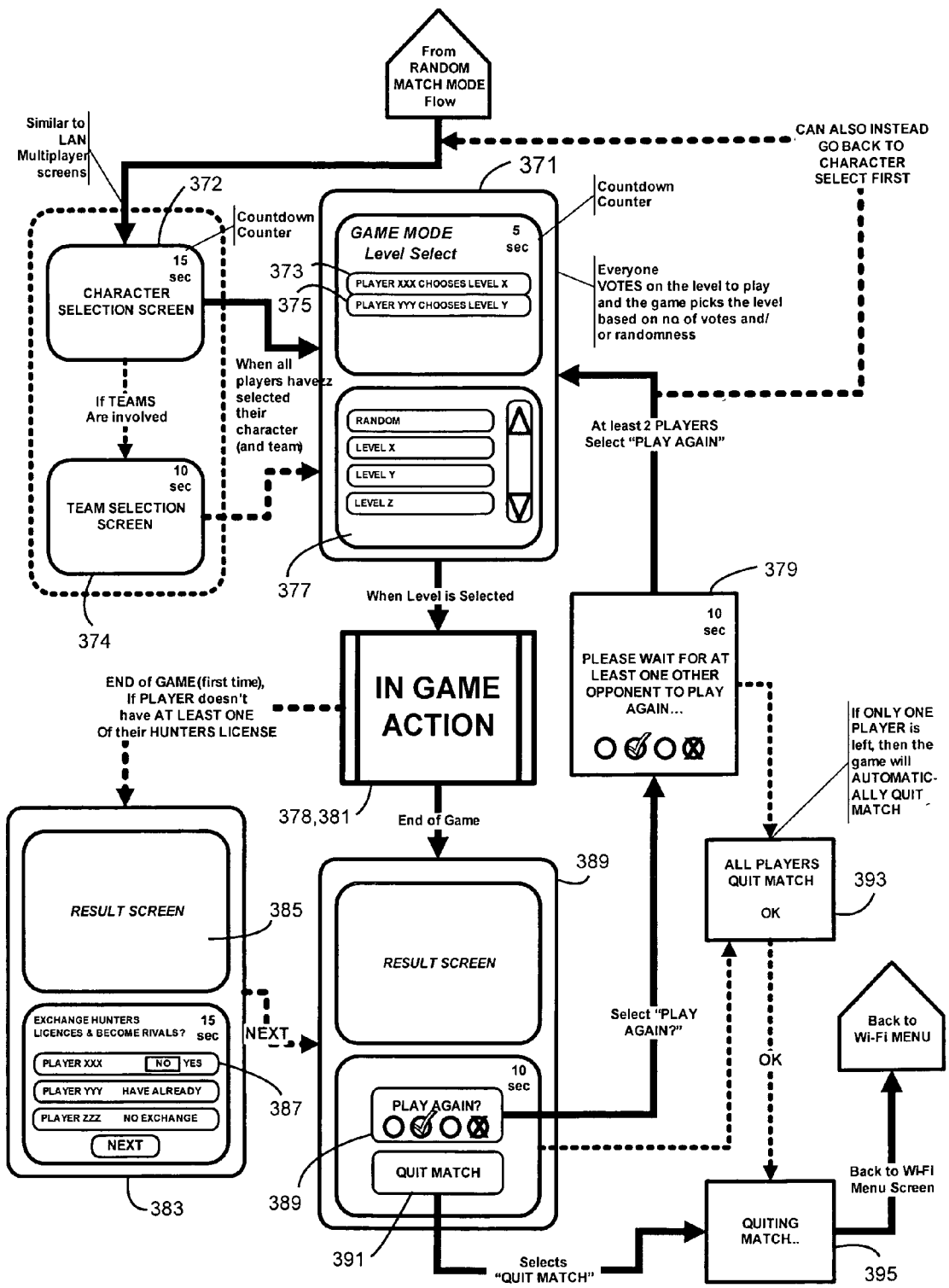
FIG. 11 shows an exemplary flow of an illustrative non-limiting level selection routine.

Once all players have selected the begin option 355 and the game has begun, the program may give the players the option to select characters 372 and, if desired, teams 374. The program then proceeds to a level selection screen 371. An exemplary flow of a level selection routine is shown in FIG. 11. The players may each select a level of choice or "random" from a list of levels 377, and the level that gets the most votes is the level played. After a level has been chose by this or any other suitable method, the program proceeds to game play 378. At the end of the first match, if a player does not have at least one of his opponent's hunter's licenses stored as a rival, the program may display a first result screen 383. This screen 383 may show the results 385 of the match, and may give the players the option 387 to exchange licenses and become rivals. Alternatively, if the players have already become rivals with each other in the past, the program proceeds to a second result screen 389. This screen may also display the results 385 of the match, and may additionally give the players the options to play again 389, quit the match 391, or any other suitable options. This screen 389 is also displayed after the exchange decisions have been made from the first result screen 383.

If a player selects play again, the game then waits 379 to see if at least a second player selects play again. If at least two players select play again, the game returns to the level selection screen menu 371. If all players or all but one player select quit match, then the game may inform 393 the players that the match is over, display 395 a message while quitting the match, and return to the Wi-Fi menu.

Figure 12:
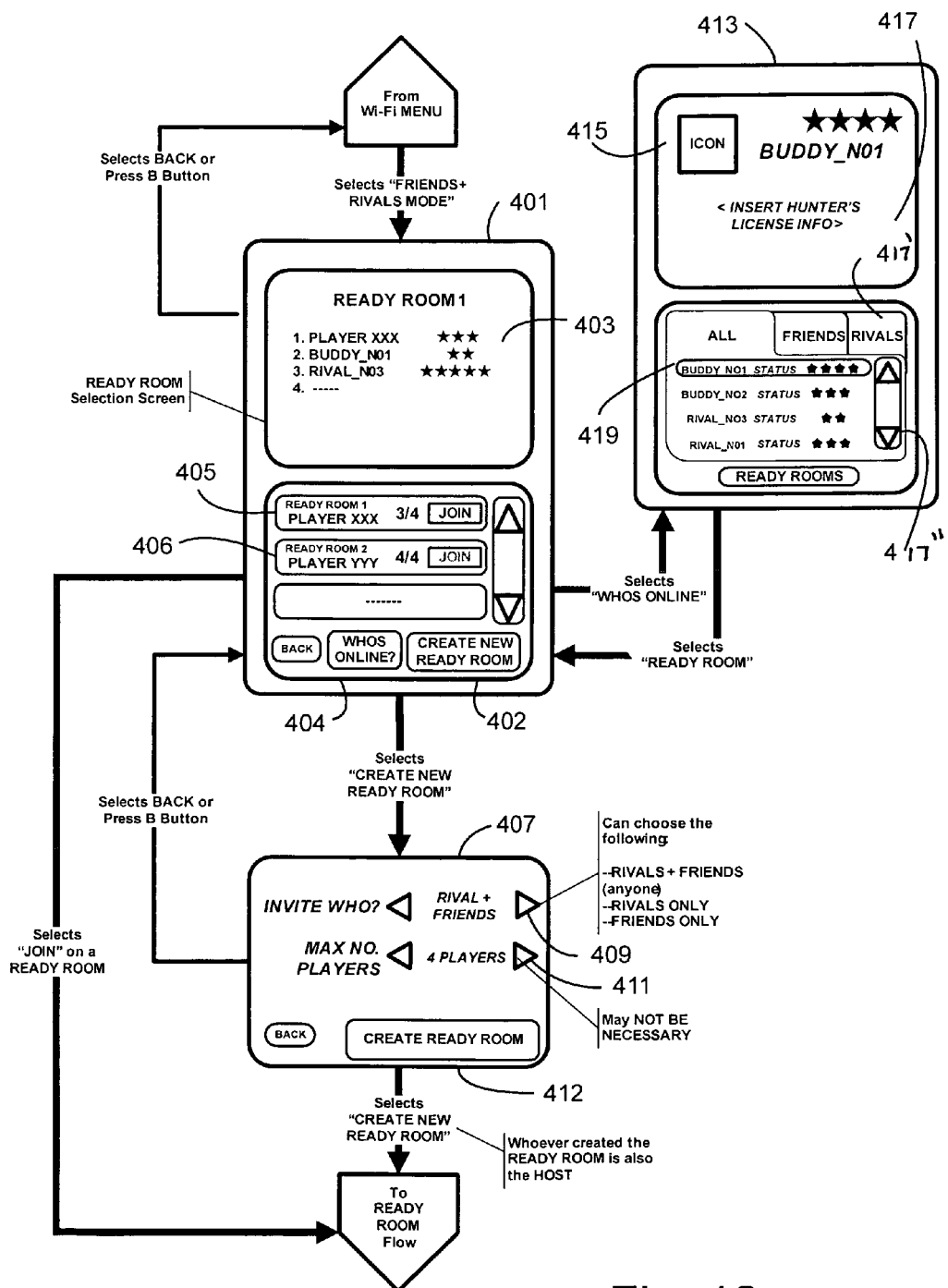
FIG. 12 shows an exemplary flow of an illustrative non-limiting friends/rivals routine.

If, from the Wi-Fi menu 311, a player selects friends/rivals mode 319, then according to a further exemplary illustrative non-limiting implementation, the program proceeds to a friends/rivals mode. An exemplary flow for this mode is shown in FIG. 12. A friends/rivals mode is a mode wherein the player will only be playing against other players previously demarked or "bookmarked" as buddies or rivals. The program may display a friends/rivals menu 401. This menu may contain a list of the players currently in the ready room in which the player currently resides, and a list 405 of ready rooms available for the player to join.

The list 405 of ready rooms may also show how many players 408 are currently in an available ready room. If the maximum number of players are already present, then the join button 406 is grayed out and a new player cannot join that room.

The player may also be presented with the options 404, 402 to find out who else is online and to create a new ready room.

If the player selects the option 404 to see who is online, the program may display an online status menu 413. This menu may display a tabbed listing 418 of all friends/rivals currently online. The player can use the tabs 417 to sort the list into all friends/rivals, friends, or rivals. The player can also select an individual opponent 419 and see an information display 415 about that particular opponent.

If the player selects the option 404 to create a new ready room, the program may give the player a set of choices 407 as to how he would like to set-up the ready room. These option may include an option 407 to select types of invitees, such as friends, friends and rivals, or rivals. Another possible option 411 could be a selection of the maximum number of players. Any other suitable options may also be added. When the player has chosen the desired options, he can then select an option 412 to create the ready room.

Figure 13:
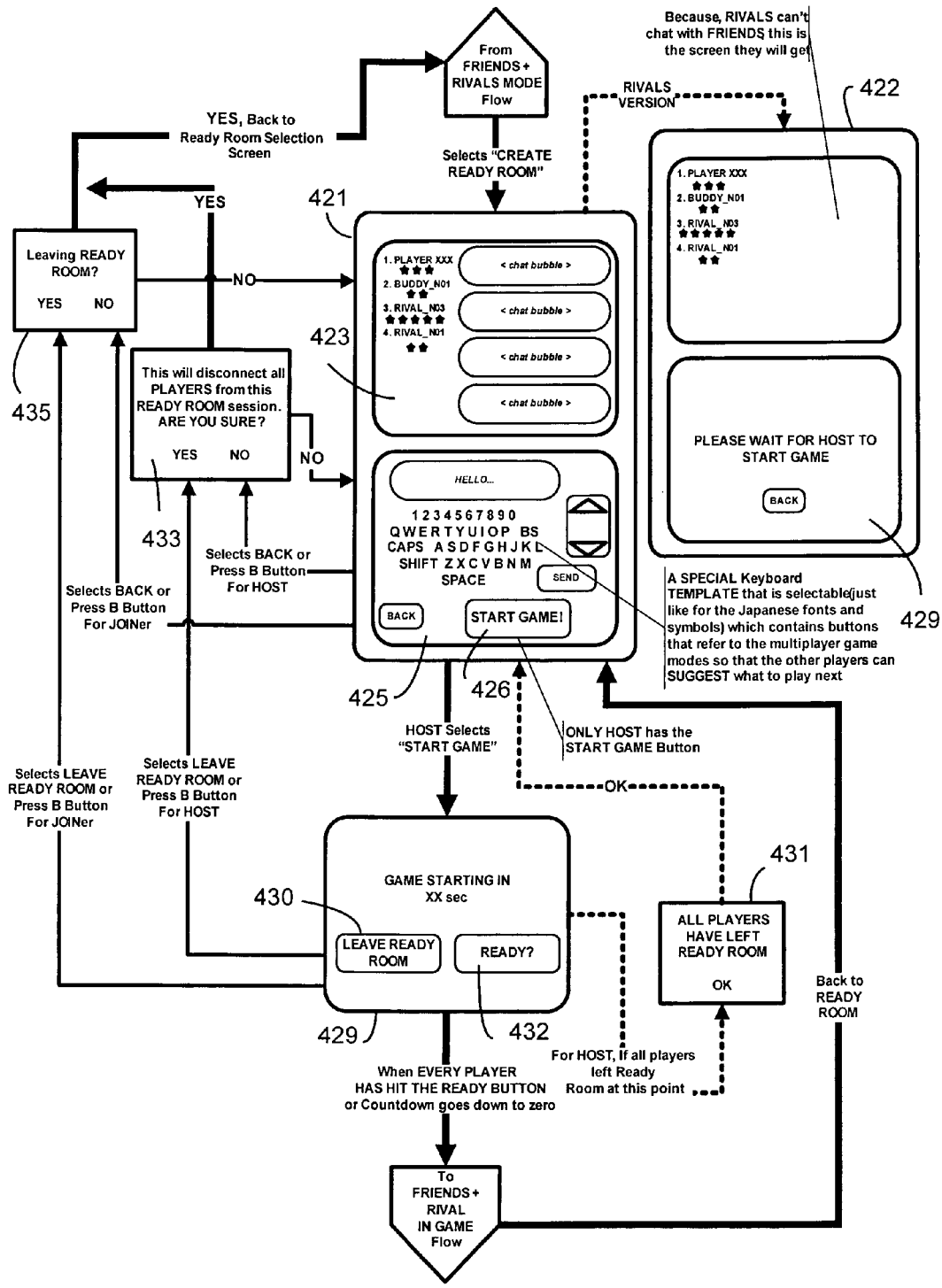
FIG. 13 shows an exemplary flow of an illustrative non-limiting ready room menu routine.

Once the player has elected to create a ready room, the program may display a ready room menu 421, an exemplary flow for which is shown in FIG. 13. This menu may display information 423 on the players currently in the ready room. Players may also have the ability to chat with other buddies currently in the ready room, if those players are buddies with each other. According to one exemplary illustrative non-limiting implementation, only the host player is provided with the option 426 to start the game. All the other players are simply provided with the chat capability 425 to chat with other buddies in the rival room.

Since players cannot chat with people who are their rivals, anyone who is a rival of the player who created the ready room will be shown a modified ready room menu 421. This menu will not have chat bubbles, but will have a listing 427 of the players currently in the ready room. Instead of a chat capability 425, the rival player will just see an instructional message 428 in the exemplary illustrative non-limiting implementation.

Once the host player has selected the option 426 to start the game, players may see a message 429 giving them the option 430 to leave the ready room 429 or select ready 432. Any player selecting the option 430 leave ready room 429 may see a prompt 435 informing him that he is leaving the ready room. If the host selects the option 430 to leave ready room 429, the program may display a different prompt 433, informing the host player that this choice will disconnect all players from this ready room. These prompts 435, 433 may also be displayed if a player hits a button corresponding to back/undo, such as a "b" button in this exemplary implementation. If all non-host players select "leave ready room" 429, then the host player is returned to the ready room menu 421. If at least the host and one other player select ready 432, then the program proceeds to the friends/rivals in-game mode.

Figure 14:
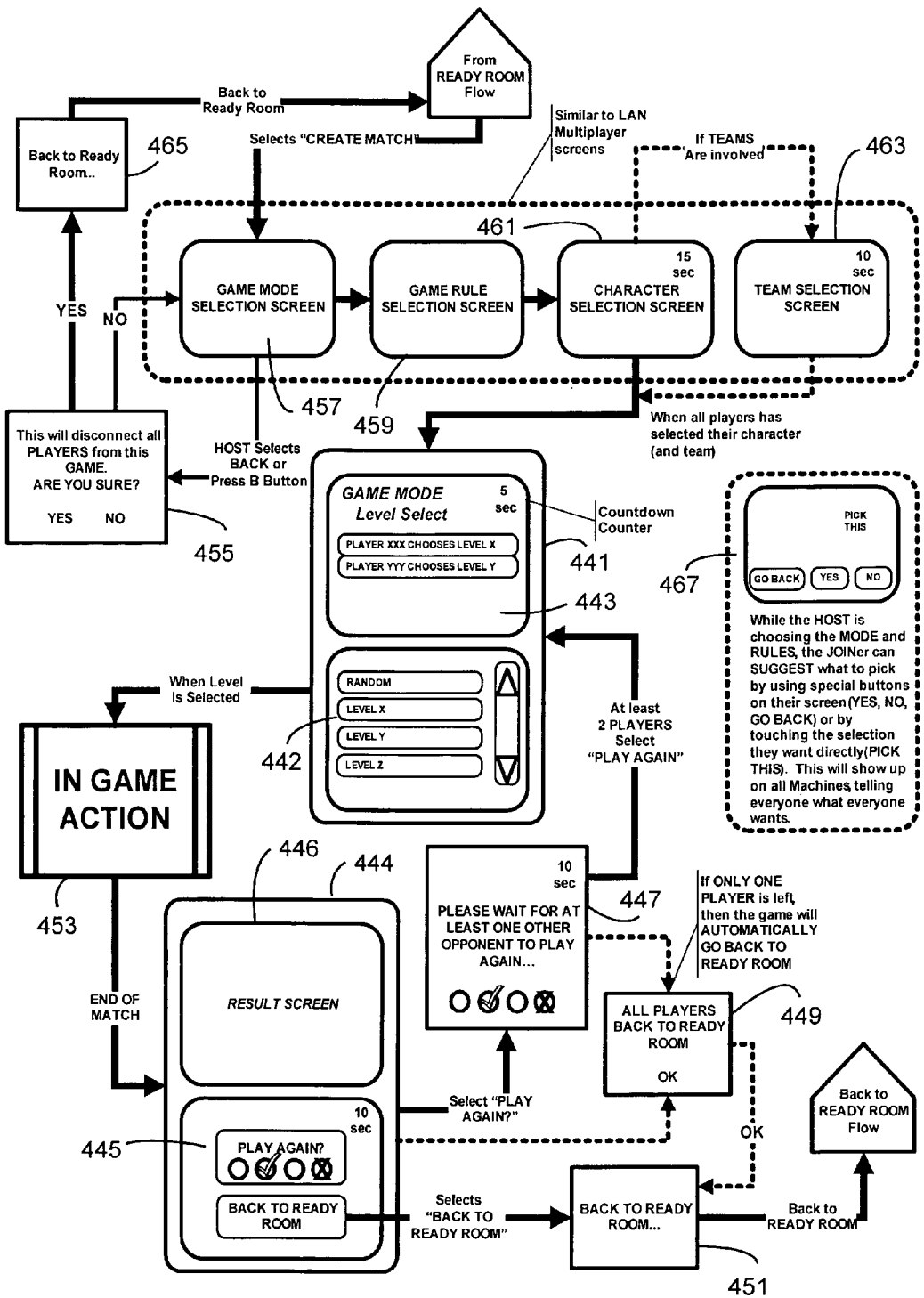
FIG. 14 shows an exemplary flow of an illustrative non-limiting friends/rivals in-game routine.

FIG. 14 shows an exemplary illustrative non-limiting implementation of a friends/rivals in-game mode flow. According to this exemplary implementation, a host is able to select a mode 457 and rules 459 for an upcoming match. While the host is selecting the mode 457 and rules 459, other players may use a special menu 467 to suggest which modes/rules they would like to see used. All participating players can also select a character 461 and, if necessary, form teams 463. If, during these selection periods, the host presses the back button on his controller, the host may be given a disconnect warning 455. If the host elects to disconnect, all players are given a back to ready room message 465 and sent back to the ready room menu 421. Otherwise, after all players have selected a character, and team if necessary, the program displays a level select menu 441.

From the level select menu 441, each player can choose a level from a list 442 of levels. The menu 441 may also display 443 which levels were selected by each player.

After all players have selected a level, the program decides which level will be played based on the majority vote of the players, indicated by level selection. If there is a tie, then the program randomly chooses between the tied selections. The in-game action 453 then occurs.

Once the game has finished, the program displays a result menu 444. This menu may show the results 446 of the game, and give the players the options 445 to play again or return to the ready room. If at least two players select play again, their machines will return to the level select menu 441. Once one player has selected play again, his machine may display a please wait message 447. If no other players select play again, all players may see a back to ready room message 449, 451. The program then returns to the ready room menu 421.

Figure 15:
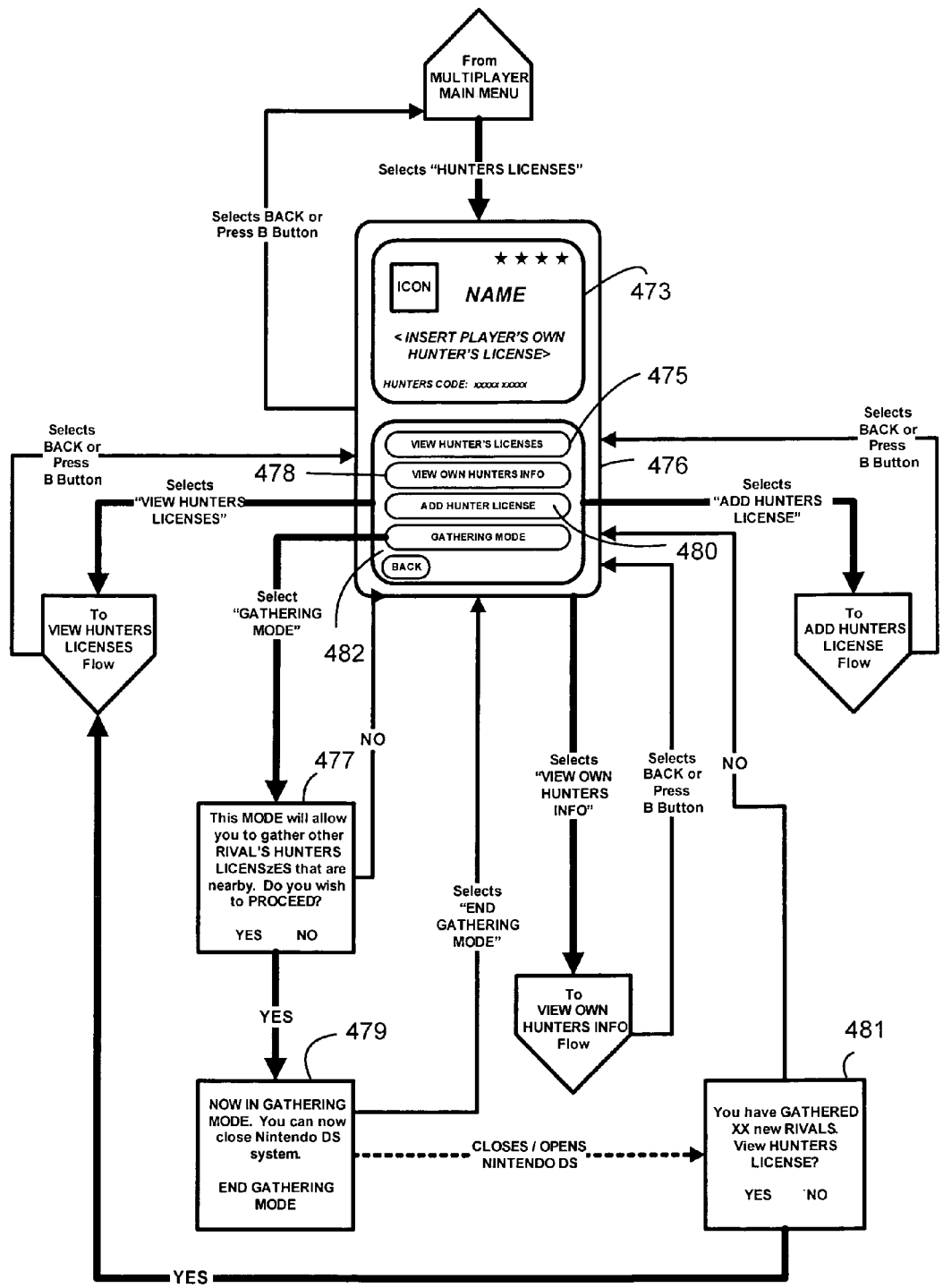
FIG. 15 shows an exemplary flow of an illustrative non-limiting hunter's licenses routine.

FIG. 15 shows an exemplary illustrative non-limiting implementation of a hunter's licenses mode flow. This is reached if the player selects hunter's licenses from the multiplayer main menu 281. According to this exemplary implementation, the program displays a hunter's license menu 471. This menu 471 may contain information 473 about the player's own hunter's license, as well as a list of options 475 that the player can choose. These options may include view hunter's licenses 476, view own hunters info 478, add hunter license 480, and gathering mode 482. Other suitable options may be included or some of these options may be omitted as the game designer desires.

If the player selects gathering mode 482, an information message 477 explaining what gathering mode is may pop up. If the player elects to continue with gathering mode, the player will see a second information message 479, informing him that he does not need to use his device while the mode is processing. Once the gathering mode is complete, the player may be shown a message 481 telling him that he can view the hunter's licenses that he gathered. Electing to view these licenses takes the player to the same view as if he had selected view hunter's licenses 476 from the hunters license menu 471. If the player does not choose to view the hunter's licenses, he is returned to the hunters license menu 471.

Figure 16:
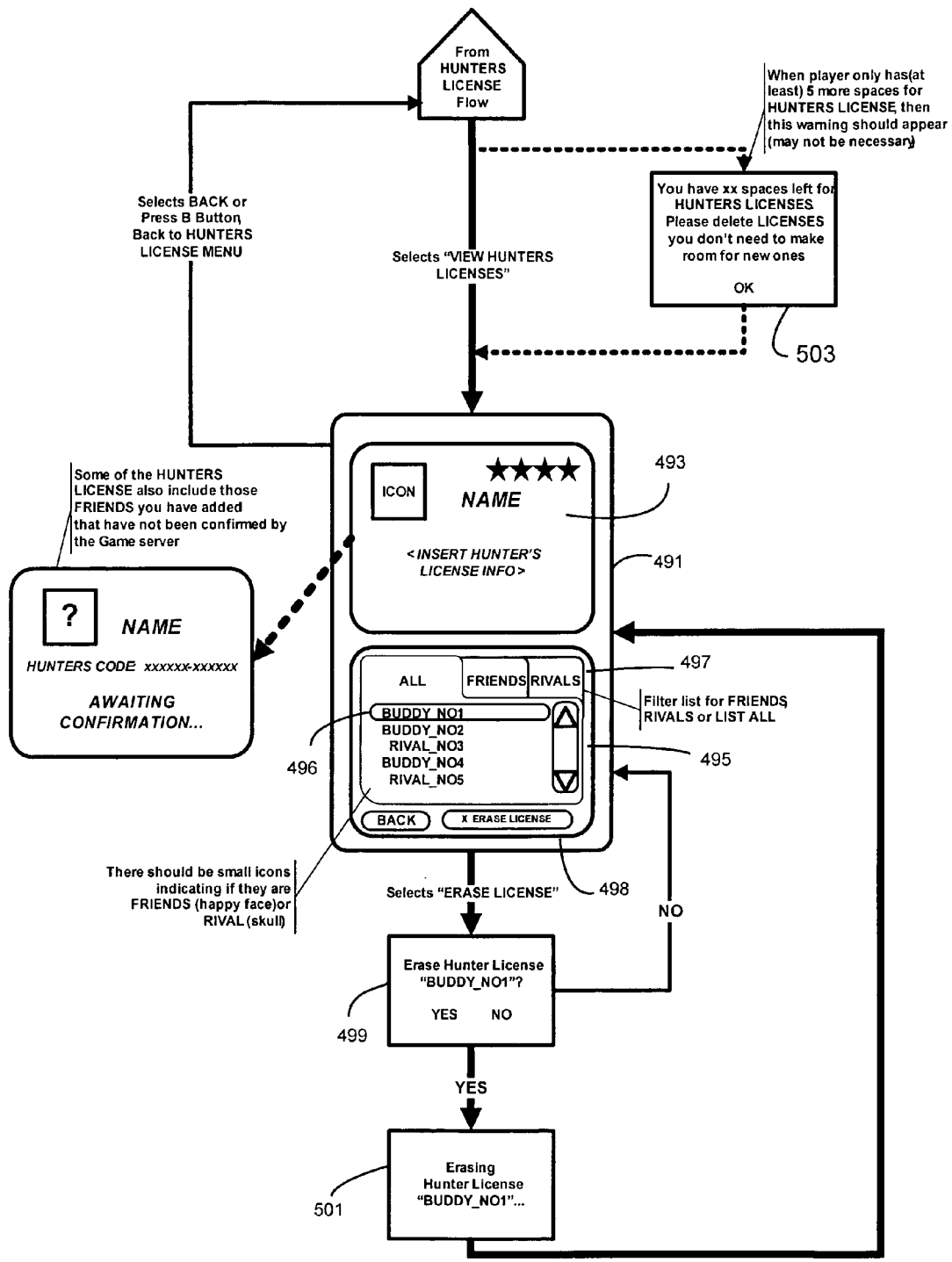
FIG. 16 shows an exemplary flow of an illustrative non-limiting view hunter's licenses routine.

FIG. 16 shows an exemplary illustrative non-limiting implementation of a view hunter's licenses mode flow. If the player selected view hunter's licenses 476 from the hunter's license menu 471, or if the player elected to view hunter's licenses after gathering licenses, he will arrive at the view hunter's licenses menu 491. The player may receive a warning message 503 if his space for storing hunter's licenses is getting low.

The view hunter's licenses menu 491 displays a sortable list 495 of all hunter's licenses collected by the player. The player can choose to view all licenses, friends' licenses, or rivals' licenses through the use of the tabs 497 above the list 495. If a player selects an individual opponent 496, the menu 491 displays information 493 relating to that opponent's hunter's license. The player also has the option 498 to erase a selected hunter's license.

If the player opts to erase a license, the player will be prompted 499 to ensure he wants to erase the license. If he selects no, he will be returned to the view hunter's licenses menu 491. If he selects yes, the selected hunter's license will be erased from his machine, and a message 501 informing him of such will be displayed.

Figure 17:
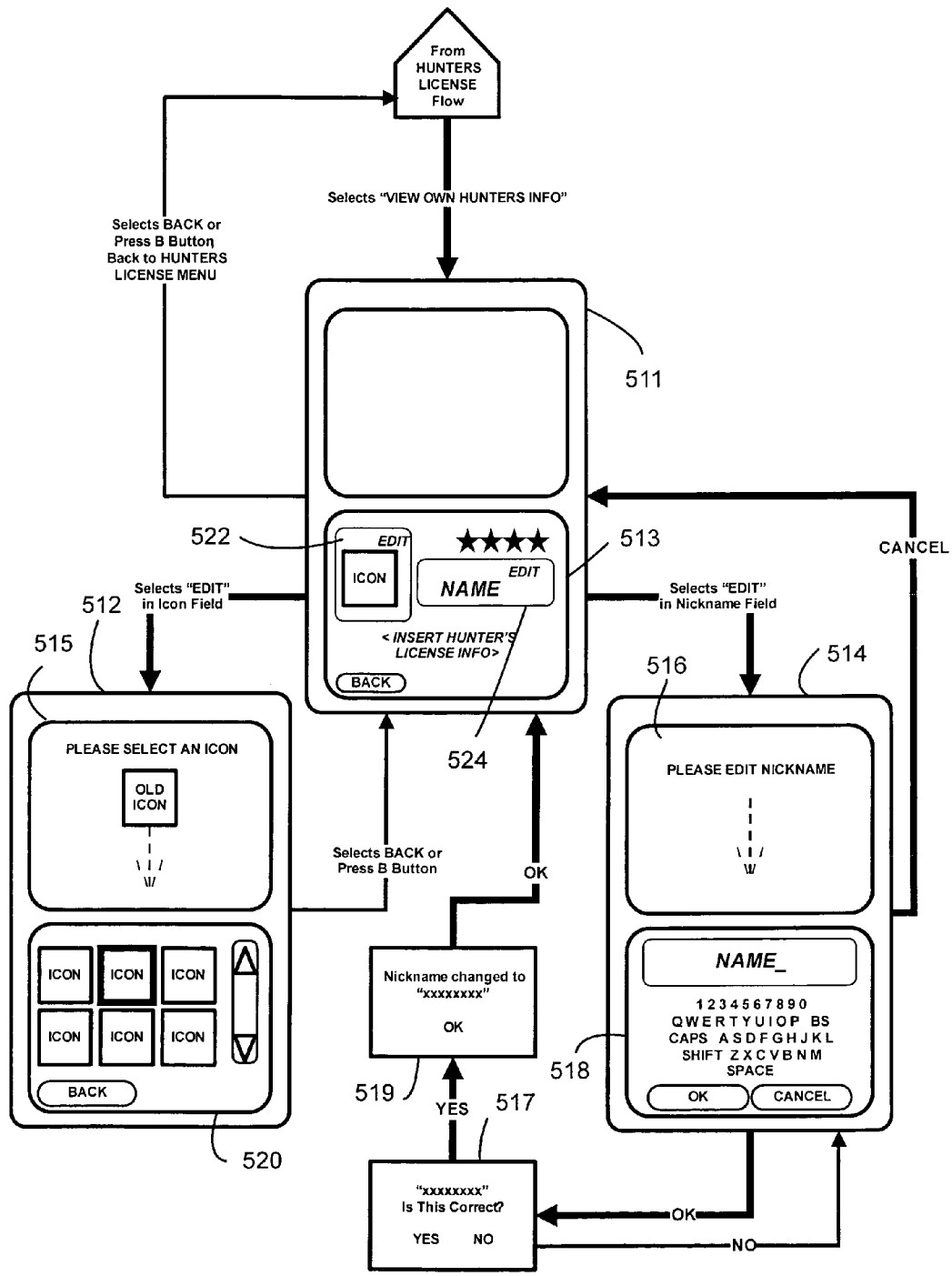
FIG. 17 shows an exemplary flow of an illustrative non-limiting view own license routine.

If the player elects to view his own hunter's info 478, he may be directed to a view own license menu 511. An exemplary illustrative non-limiting implementation of a view own license mode flow is shown in FIG. 17.

The view own license menu 511 shows the player his currently selected information 513. The player can also choose to edit his name 524 and his icon 522 from this menu.

If the player chooses to edit his icon, he will be directed to an edit icon menu 512. This menu shows the old icon 515 that was previously selected, along with a list 520 of available icons. The player can choose from this list and update his icon.

If the player chooses to change his nickname, he will be directed to an edit name menu 514. This menu instructs 516 the player to change his name, and provides a virtual keypad 518 allowing the player to select a new name. Once the name has been selected, the program may ask 517 the player if the name is correct. If the player agrees with the name change, the program may then show a message 519 informing the player that his name has been changed.

Figure 18:
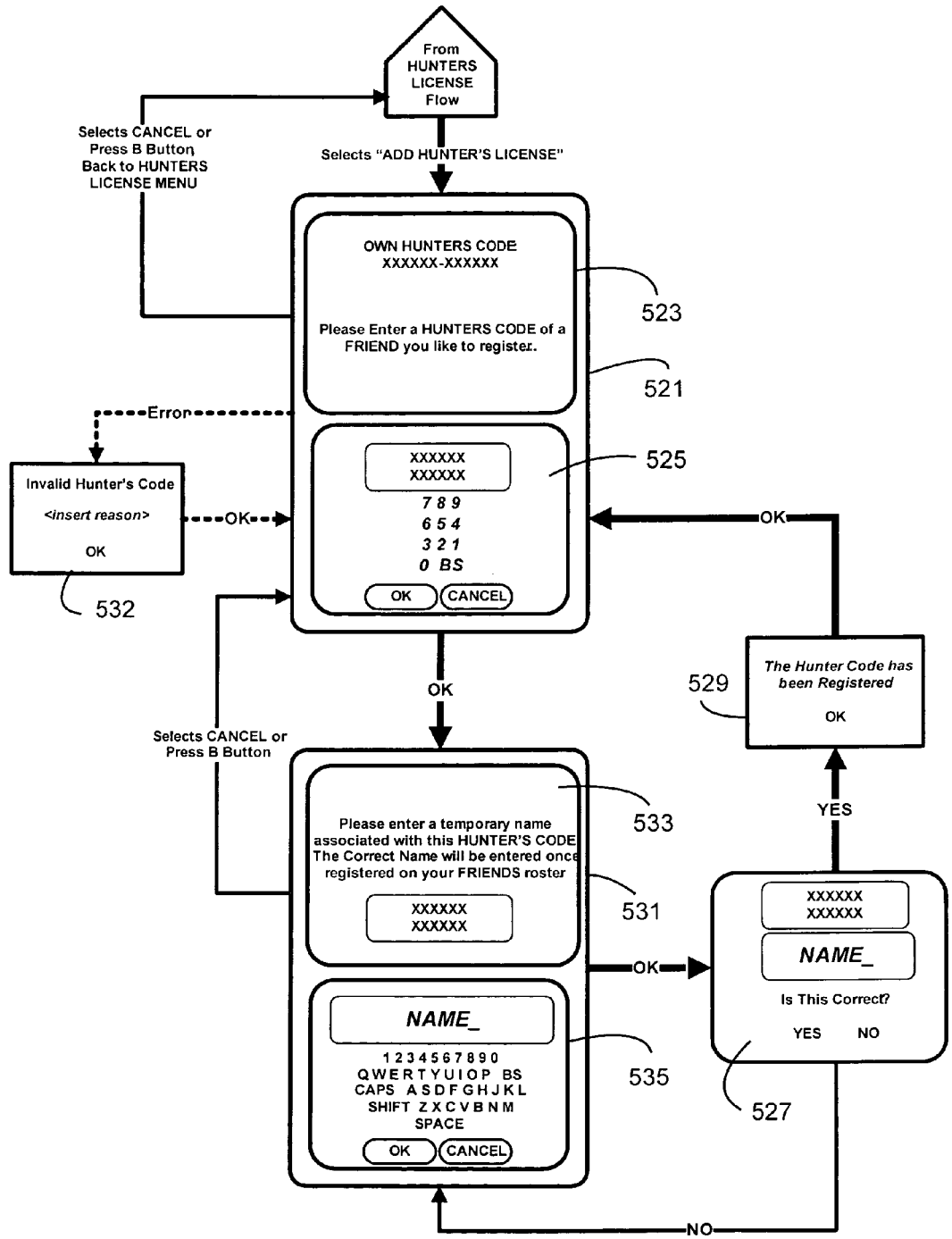
FIG. 18 shows an exemplary flow of an add license menu routine.

If the player wishes to add a buddy's hunter's license, he will select "add hunter license" 480 from the hunter's license menu 471. This will direct him to an "add license" menu, an exemplary flow for which is shown in FIG. 18. The add license menu 521 shows the player's hunter's license information 523. It also provides an option 525 to enter the hunter's code of another hunter.

The player can then enter the hunter's code of another hunter and, if the code is correct, the player will be directed to the name license menu 531. If the player enters an invalid hunter's code, an error message 532 may appear. The name license menu 531 prompts 533 the player to enter a temporary name for this hunter, which will remain until the server registers the license. The license is registered once the selected hunter also enters the player's proper hunter's code. The player is provided with a virtual keypad 535 with which to enter a temporary name.

Once the player has entered the name, he is prompted 527 to ensure the name is correct. If the name is accurate, the player is informed 529 that the hunter's code has been registered for the selected hunter.

While the technology herein has been described in connection with exemplary illustrative non-limiting implementations, the invention is not to be limited by the disclosure. For example, while exemplary illustrative non-limiting implementations have been described in connection with portable wireless video game platforms, any sort of appliance capable of being connected to a wired and/or wireless network may be used. Although exemplary illustrative non-limiting implementations have been described in connection with the use of "Friends" and "Rivals" categories of potential game players, other categories based on other characteristics (e.g., gender, age, geographical area, local or remote connection, IP address, name, school grade, digital signature, ability to authenticate identity, nationality, or any other characteristic) could be used instead. While exemplary illustrative non-limiting implementations distinguish between different categories of potential players by permitting chat with some but not with others, other types of operational or mode differences (e.g., selective filtering or recording of chat content, selective game play or game level access, etc.) could be provided instead. The invention is intended to be defined by the claims and to cover all corresponding and equivalent arrangements whether or not specifically disclosed herein.

We claim:

1. Apparatus providing wireless chat communications across a wireless data communications network between a first wireless communications device used by a first person and a second wireless communications device used by a second person, the first wireless communications device comprising a first wireless communications circuit enabling the first wireless communications device to communicate wirelessly with at least the second wireless communications device across the network, the second wireless communications device comprising a second wireless communications circuit enabling the second wireless communications device to communicate wirelessly with at least the first wireless communications device across the network, the apparatus comprising:
a memory storing computer executable instructions controlling at least one computer processor to check stored machine-readable information to determine whether a machine-readable indicator indicates a friend relationship exists between the first person and the second person;
a proximity detector that detects, based on first and second device wireless radio communications, whether the first device and the second device are in physical proximity to one another;
the processor being configured so that when the processor determines the machine-readable indicator indicates the friend relationship exists between the first person and the second person, the processor enables the first device to wirelessly chat with the second device across the network; and
the processor being further configured so that when the proximity detector detects the first device and second device are in physical proximity with one another and the machine-readable indicator does not indicate a friend relationship exists between the first person and the second person, the processor enables wireless communications across the network between the first device and the second device but automatically restricts the content of network communications between the first device and the second device as compared to the wireless chat the processor enables between the first device and the second device when the machine-readable indication indicates a friend relationship exists between the first person and the second person.

2. Apparatus as in claim 1 wherein the restricted network communications content comprises restricted wireless chat.

3. The apparatus of claim 1 wherein the restricted network communications content does not include wireless chat.

4. The apparatus of claim 1 wherein the restricted network communications content includes multiplayer game play.

5. The apparatus of claim 1 wherein the enabled wireless chat comprises freeform chat and the restricted network communications content consists of pre-scripted chat.

6. The apparatus of claim 1 wherein the processor is structured to display, on a display device, an icon of the first person indicating whether wireless chat with the first person is permissible.

7. The apparatus of claim 1 wherein the enabled wireless chat includes voice chat.

8. The apparatus of claim 1 wherein the enabled wireless chat includes video chat.

9. The apparatus of claim 1 wherein the proximity detector comprises an ad hoc local area network communications transceiver that detects whether the first and second wireless communications circuits are within range.

10. The apparatus of claim 1, wherein the first wireless communications device automatically wirelessly receives and detects identities of other wireless communications devices in proximity to the first wireless communications device.

11. The apparatus of claim 1, wherein the proximity detector detects the first and second devices are in physical proximity to one another based on both devices being connected to the same local area wireless network.

12. The apparatus of claim 1, wherein the proximity detector detects the first and second devices are in physical proximity to one another when both devices are connected to a common Wi-Fi connection.

13. The apparatus of claim 1, wherein the processor enables the first person and the second person to establish a friend relationship with one another when the proximity detector detects that the first device can wirelessly communicate locally with the second device.

14. The apparatus of claim 1, wherein the proximity detector detects that the first device is in physical proximity to the second device when the first and second devices are in the same vicinity.

15. The apparatus of claim 1, wherein the proximity detector detects that the first device is in physical proximity to the second device when the first and second devices are within a 20-meter range.

16. The apparatus of claim 1, wherein the proximity detector detects that the first device is in physical proximity to the second device when the first and second devices are within a point-to-point wireless communications range.

17. Apparatus for providing wireless chat communications across a wireless data communications network between a first wireless device associated with a first person and a second wireless device associated with a second person, the first wireless device comprising a first wireless communications circuit enabling the first wireless device to communicate wirelessly with at least the second wireless device across the network, the second wireless device comprising a second wireless communications circuit enabling the second wireless device to communicate wirelessly with at least the first wireless device across the network, the apparatus comprising:

a detector that detects, based on first and second device wireless radio communications, whether the first device and the second device are in the same vicinity;

a memory storing computer executable instructions causing at least one computer processor to check stored machine-readable relationship indicating information to determine whether a predetermined relationship exists between the first person and the second person;

the processor being configured so that upon the processor determining, based on the stored machine-readable relationship indicating information, that the predetermined relationship exists between the first person and the second person, the processor enables the first person and the second person to wirelessly chat together over the network using the first and second wireless devices; and the processor being further configured so that if the processor determines, based on the stored machine-readable relationship indicating information not indicating that the predetermined relationship exists between the first person and the second person and the detector detects that the first and second devices are in the same vicinity, the processor automatically enabling the first and second persons to wirelessly communicate together over the network using the first and second wireless devices while restricting network communications between the first device and the second device as compared to the wireless chat the processor enables between the first device and the second device when the processor determines that the predetermined relationship exists between the first person and the second person.

18. The apparatus of claim 17 wherein the proximity detector comprises an ad hoc local area network communications transceiver that detects whether the first and second wireless communications circuits are in the same vicinity.

19. A wireless communications device comprising:

a processor;

at least one memory coupled to the processor, the at least one memory storing instructions for execution by the processor;

a touch panel display device connected to the processor, the processor receiving user input from the touch panel display device and displaying graphics and text on the touch panel display device;

a wireless communications circuit connected to the processor, the wireless communications circuit enabling the wireless communications device to communicate wirelessly with other wireless communications devices;

the processor selectively enabling restricted communications content between the wireless communications device and at least one other wireless communications device conditioned on whether (a) the wireless communications device is in the vicinity of the at least one other wireless communications device, and (b) a stored machine-readable indicator does not indicate that a predetermined relationship exists between a user identifier associated with the wireless communications device and a user identifier associated with the at least one other wireless communications device.

20. The wireless communications device of claim 19 wherein the stored machine-readable indicator has a first state indicating that a first user has friended a second user, and a second state indicating that the first user is not a declared friend of the second user.

21. The wireless communications device of claim 19 wherein the wireless communications circuit provides an indication that the wireless communications device is in the vicinity of the other wireless communications device.

* * * * *